United States Patent
Garcia-Luna-Aceves

(10) Patent No.: US 11,251,933 B2
(45) Date of Patent: Feb. 15, 2022

(54) COLLISION AVOIDANCE IN MULTI-HOP AD-HOC NETWORKS USING HALF DUPLEX TRANSCEIVERS

(71) Applicant: The Regents of the University of California, Oakland, CA (US)

(72) Inventor: Jose Joaquin Garcia-Luna-Aceves, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 100 days.

(21) Appl. No.: 16/674,686

(22) Filed: Nov. 5, 2019

(65) Prior Publication Data

US 2020/0145179 A1    May 7, 2020

Related U.S. Application Data

(60) Provisional application No. 62/755,788, filed on Nov. 5, 2018, provisional application No. 62/780,002, filed on Nov. 9, 2018.

(51) Int. Cl.
*H04B 7/00* (2006.01)
*H04L 5/16* (2006.01)
(Continued)

(52) U.S. Cl.
CPC .............. *H04L 5/16* (2013.01); *H04L 5/0051* (2013.01); *H04L 5/0055* (2013.01); *H04L 12/413* (2013.01); *H04W 84/18* (2013.01)

(58) Field of Classification Search
CPC ... H04W 4/02; H04W 28/021; H04W 28/044; H04W 72/02; H04W 72/0486; H04W 72/1252; H04W 76/02; H04W 88/02
(Continued)

(56) References Cited

U.S. PATENT DOCUMENTS

| | | | |
|---|---|---|---|
| 7,881,340 B2* | 2/2011 | Farrag ................... | H04W 74/02 370/468 |
| 8,681,810 B2* | 3/2014 | Nandagopalan .. | H04W 74/0808 370/445 |

(Continued)

OTHER PUBLICATIONS

Abramson, N., "The Throughput of Packet Broadcasting Channels," IEEE Transactions on Communications, Jan. 1977, pp. 117-128, vol. 25, Issue 1.
(Continued)

*Primary Examiner* — Dmitry Levitan
(74) *Attorney, Agent, or Firm* — Wolter Van Dyke Davis, PLLC; Eugene J. Molinelli; Cian O'Brien

(57) ABSTRACT

Techniques for collision avoidance on a current receiving network node using a half duplex wireless transceiver include, in response to receiving a request to transmit a variable length data message from a first node, transmitting a clear to transmit message that indicates the first node followed by transmitting a physical layer first pilot message. In some circumstances, the techniques include transmitting an acknowledgement message that indicates the first node, only in response to successfully receiving the variable length data message that indicates the first node followed by receiving a physical layer second pilot message. The second pilot message can be detected using either or both of energy detection and preamble detection.

18 Claims, 11 Drawing Sheets

(51) Int. Cl.
 H04L 12/413 (2006.01)
 H04W 84/18 (2009.01)
 H04L 5/00 (2006.01)
(58) Field of Classification Search
 USPC .......................... 370/310, 312, 432, 445, 449
 See application file for complete search history.

(56) References Cited

U.S. PATENT DOCUMENTS

| | | | | |
|---|---|---|---|---|
| 8,737,321 | B2* | 5/2014 | Ribeiro | H04W 28/26 370/329 |
| 8,885,631 | B2* | 11/2014 | Mo | H04W 56/002 370/350 |
| 8,964,618 | B2* | 2/2015 | Seok | H04W 40/244 370/311 |
| 9,398,611 | B2* | 7/2016 | Choi | H04W 52/0216 |
| 9,769,758 | B2* | 9/2017 | Kim | H04W 52/0216 |
| 9,794,949 | B2* | 10/2017 | Bhargava | H04K 3/28 |
| 9,848,453 | B2* | 12/2017 | Li | H04W 72/0453 |
| 10,432,415 | B2* | 10/2019 | Lee | H04L 12/1877 |
| 2004/0196871 | A1* | 10/2004 | Terry | H04W 28/06 370/477 |
| 2010/0080173 | A1* | 4/2010 | Takagi | H04L 27/0006 370/328 |
| 2020/0145179 | A1* | 5/2020 | Garcia-Luna-Aceves | H04L 5/0048 |

OTHER PUBLICATIONS

Carvalho, M.M., et al."Modeling Energy Consumption in Single-Hop IEEE 802.11 Ad Hoc Networks," IEEE Proc. 13th International Conference on Computer Communications and Networks, Oct. 11-13, 2004, pp. 367-372, DOI: 10.1109/ICCCN.2004.1401671.

Fulmer, C.L. and Garcia-Luna-Aceves, J.J., "FAMA-PJ: a channel access protocol for wireless LANs," Proc. of the 1st Annual International Conference on Mobile Computing and Networking, Dec. 1995, pp. 76-85, DOI 10.1145/215530.215559.

Fulmer, C.L. and Garcia-Luna-Aceves, J.J., "Solutions to Hidden Terminal Problems in Wireless Networks," ACM Sigcomm Computer Communication Review, Oct. 1997, pp. 39-49, DOI: 10.1145/263109.263137.

Garcia-Luna-Aceves, J.J. and Tzamaloukas, A., "Receiver-Initiated Collision Avoidance in Wireless Networks," Wireless Networks, 2002, pp. 249-263.

Garcia-Luna-Aceves, J.J., "Carrier-Sense Multiple Access with Collision Avoidance and Detection," Proc. ACM MSWIM '17, Nov. 21-25, 2017, pp. 53-61, DOI: 10.1145/3127540.3127551.

Garcia-Luna-Aceves, J.J., "Carrier Resolution Multiple Access," Proc. ACM PE-WASUN '17, Nov. 2017, pp. 1-8, DOI: 10.1145/3134829.3134832.

Garcia-Luna-Aceves, J.J., "Carrier-Tone Multiple Access with Collision Avoidance and Detection," Proc. IEEE WCNC '18, Apr. 15-18, 2018, pp. 1-6, DOI: 10.1109/WCNC.2018.8377398.

Garcia-Luna-Aceves, J.J. and Carvalho, M.M., "Collaborative Collision Detection with Half-Duplex Radios," Proc. IEEE WCNC'18, Apr. 15-18, 2018, pp. 1-6, DOI: 10.1109/WCNC.2018.8377339.

Garcia-Luna-Aceves, J.J., "Implementing Correct and Efficient Collision Avoidance in Multi-Hop Ad-Hoc Networks," 2018 IEEE 37th International Performance Computing and Communications Conference (IPCCC), Nov. 17-19, 2018, pp. 1-10, DOI: 10.1109/PCCC.2018.8710830.

Haas, Z.J. and Deng, J., "Dual Busy Tone Multiple Access (DBTMA)—A Multiple Access Control Scheme for Ad Hoc Networks," IEEE Trans. Commun., Jun. 2002, pp. 975-985, vol. 50, No. 6.

Jamieson, K., et al., "Understanding The Real-World Performance of Carrier Sense," Proc. ACM E-WIND '05, ACM Workshop on Experimental Approaches to Wireless Network Design and Analysis, Aug. 2005, pp. 52-57, DOI: 10.1145/108014.1080160.

Karn, P., "MACA—A New Channel Access Method for Packet Radio," Proc. ARRL/CRRL, Amateur Radio 9th Computer Networking Conference, 1990, pp. 134-140, vol. 37.

Kleinrock, L., "Packet Switching in Radio Channels: Part I—Carrier Sense Multiple-Access Modes and Their Throughput-Delay Characteristics," IEEE Transactions on Communications, Dec. 1975, pp. 1400-1416, vol. 23, No. 12.

Tobagi, F.A. and Kleinrock, L., "Packet Switching in Radio Channels: Part II—The Hidden Terminal Problem in Carrier Sense Multiple-Access Modes and The Busy-Tone Solution," IEEE Trans. Commun., 1975, pp. 1417-1433, vol. 23, No. 12.

\* cited by examiner

COLLISION AVOIDANCE IN MULTI-HOP AD-HOC NETWORKS USING HALF DUPLEX TRANSCEIVERS

BACKGROUND

Networks of general purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein. The internetwork header provides information defining the source and destination address within the network. Thus, the packet may "hop" from node to node along its logical path until it reaches the end node.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

Some networks used wireless communication links; and, of these, some networks are ad-hoc multi-hop networks. According to Wikipedia, a "wireless ad-hoc network (WANET) or MANET (Mobile ad-hoc network) is a decentralized type of wireless network. The network is ad-hoc because it does not rely on a pre-existing infrastructure, such as routers in wired networks or access points in managed (infrastructure) wireless networks. Instead, each node participates in routing by forwarding data for other nodes, so the determination of which nodes forward data is made dynamically on the basis of network connectivity and the routing algorithm in use."

In most wireless ad-hoc networks, the nodes compete for access to shared wireless medium, often resulting in collisions (interference). Many ad-hoc network nodes use half duplex transceivers, which use the same radio channel for transmitting and receiving. Such half duplex nodes cannot receive while transmitting. Thus it is possible, and even common, due to collisions, for such nodes to miss the control plane messages and headers that are designed to control the flow of packets.

Carrier-sense multiple access (CSMA) is arguably the most widely used technique for the sharing of common radio channels in ad-hoc networks today, as it is an integral part of the IEEE 802.11 protocol standard. According to CSMA, a transmitter will not transmit while a channel is active, as determined by sensing the carrier radio frequency. This traditional collision avoidance handshake consists of a request-to-send (RTS) message in one or more data packets, a clear-to-send (CTS) message in one or more data packets, a variable length data message in one or more data packet, and an acknowledgment (ACK) message in one or more data packets.

It is well known that, while suitable for many purposes, the performance of a CSMA degrades substantially in the presence of hidden terminals. The main problem introduced by hidden terminals is that two or more transmitters around a receiver are unable to hear the transmissions from one another, which renders carrier sensing useless.

SUMMARY

It is here noted that that traditional collision avoidance protocols fail in various circumstances besides hidden terminals, especially when relying on half duplex communication links. Circumstances that lead to failure include a hidden terminal, exposed transmitters and exposed receivers. Techniques are provided for collision avoidance in multi-hop ad-hoc networks using a single half duplex channel.

In a first set of embodiments, a method implemented on a current receiving network node using a half duplex wireless transceiver includes, in response to receiving a request to transmit a variable length data message from a first node, transmitting a clear to transmit message that indicates the first node followed by transmitting a physical layer first pilot message. In some of these embodiments, the method also includes transmitting an acknowledgement message that indicates the first node, only in response to successfully receiving the variable length data message that indicates the first node followed by receiving a physical layer second pilot message. In some of these latter embodiments, the second pilot message is detected using either or both of energy detection and preamble detection.

In some embodiments of the first set, a transmission time of each of the first pilot message and the second pilot message is longer than predetermined time equal to an expected propagation delay time and an expected turnaround time. In some embodiments of the first set, each of the first pilot message and the second pilot message comprises a synchronization field and a frame delimiter field indicating an end of a physical layer frame.

In a second set of embodiments, a method implemented on a current transmitting network node using a half duplex wireless transceiver includes in response to transmitting a request to transmit message, receiving from a first node a clear to transmit message that indicates a second node followed by receiving a physical layer first pilot message. The method also includes determining whether the current network node is the second node indicated in the clear to transmit message. The method further includes transmitting a variable length data message that indicates the current node followed by an extend time delay followed by a physical layer second pilot message, only when the current network node is the second node.

In some embodiments of the second set, a transmission time of each of the first pilot message and the second pilot message is longer than predetermined time related to an expected propagation delay time and an expected turnaround time. In some embodiments of the second set, the first pilot message is detected using either or both of energy detection and preamble detection. In some embodiments of the second set, each of the first pilot message and the second pilot message comprises a synchronization field and a frame delimiter field indicating an end of a physical layer frame. In some embodiments of the second set, a sum of the extend time delay and a transmit time for the variable length data message is equal to a transmit time of a longest data packet allowed.

In some embodiments of the second set, the method also includes not transmitting any message for at least a back off time when the current network node is not the second node. The backoff time is longer than a sum of a transmit time of a longest data packet allowed and a transmit time of an acknowledgement message and a longest propagation time between non-hidden nodes. In some of these embodiments, the backoff time is a random time.

In other embodiments, a computer-readable medium or system is configured to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

A method and apparatus are described for avoiding collisions in ad-hoc multi access networks. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5x to 2x, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of nodes having a single half duplex omni-directional transceiver. However, the invention is not limited to this context. For example, in some other embodiments, nodes use directional transmissions to orient their transmissions in specific directions (e.g., using multiple-input and multiple-output, MIMO, technology).

1. Overview

Figure 1:
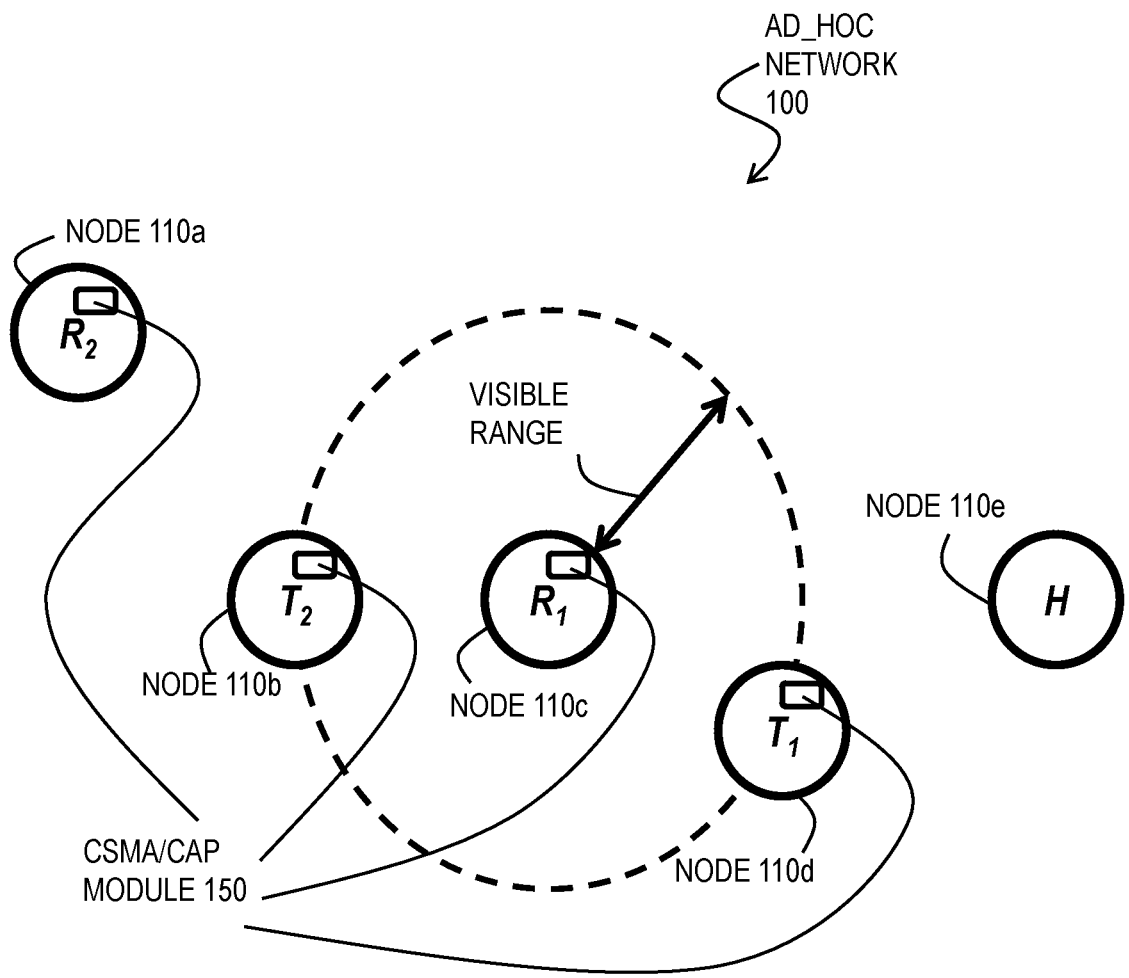
FIG. 1 is a block diagram that illustrates example nodes in an ad-hoc network, according to an embodiment.

FIG. 1 is a block diagram that illustrates example nodes 110a, 110b, 110c, 110d, 110e, (collectively referenced hereinafter as nodes 110) in an ad-hoc network 100, according to an embodiment. One or more of the nodes 110 is mobile and can move into or out of range of the others. In the illustrated embodiment, each node 110 is in communication with one or two adjacent nodes that are within a visible range; but, non-adjacent nodes are outside the visible range and are thus "hidden." The nodes 110 constitute an ad-hoc network 100 in which data packets can hop, e.g., from node 110a to node 110b to node 110c to node 110d to node 110e and to any node (not shown) sharing a network link (not shown) with node 110e.

To avoid collisions with data packets from hidden nodes while transferring data packets from one node to the next, each of nodes 110a through node 110d includes a carrier sensed multiple access collision avoidance with pilots (CSMA/CAP) module 150 comprising hardware circuitry or software or some combination. In various embodiments, the CSMA/CAP module 150 performs the methods described herein. This CSMA/CAP module 150 augments the use of traditional handshakes with the use of pilot messages (sometimes simply called "pilots"). In the most general case, a pilot is simply a bit pattern lasting long enough to ensure that any receiving node detects carrier and interprets the duration of the bit pattern as the presence of a pilot. A pilot is sent by a receiver after it sends a CTS message, and a pilot is sent by a sender after its data packet, such that multiple access interference (MAI) is avoided on data packets or ACK messages. In the illustrated embodiments, MAI on variable-length data packets and acknowledgment messages is eliminated, even in the presence of hidden terminals, exposed transmitters or exposed receivers, which may occur in multi-hop wireless networks, even when nodes operate using simple and inexpensive half-duplex transceivers.

The sequence of messages in an example exchange is described below with reference to FIG. 3 in which it is assumed for purposes of illustration that node 110a is a second receiving node ($R_2$), node 110b is a second transmitting node ($T_2$), node 110c is a first receiving node ($R_1$), node 110d is a first transmitting node ($T_1$), and node 110e is another hidden node (H).

Figure 2:
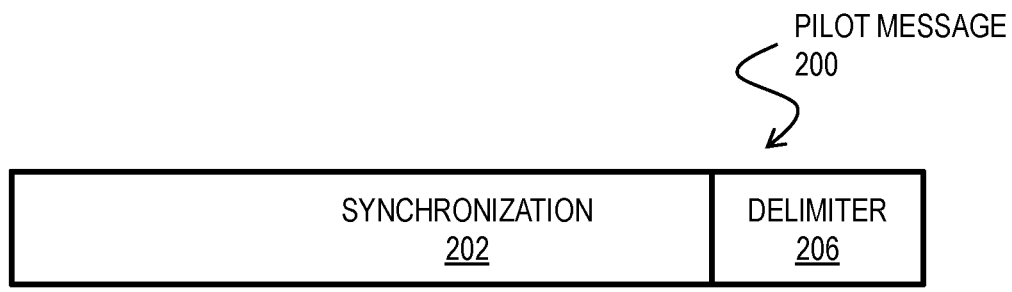
FIG. 2 is a block diagram that illustrates an example pilot message, according to an embodiment.

FIG. 2 is a block diagram that illustrates an example pilot message 200, according to an embodiment. The pilot message 200 implements the pilot bit pattern as a physical-layer convergence procedure (PLCP) frame used at the physical layer to detect the presence of either a single pilot or multiple pilots using energy detection and preamble detection. A PLCP frame comprises a synchronization field 202, and a delimiter field 206 that indicates an end of the PLCP frame. A receiving node need not be able to decode the PLCP frame used to implement a pilot, and can infer the presence of the pilot by the Received Signal Strength Indicator or RSSI reading. The duration of a pilot must be at least twice the aggregate of the maximum propagation delay time ($\tau$) allowed over a link in the network, and the time needed for the transceiver of a node to transition from transmit to receive mode (turnaround time, $\omega$).

Figure 3:
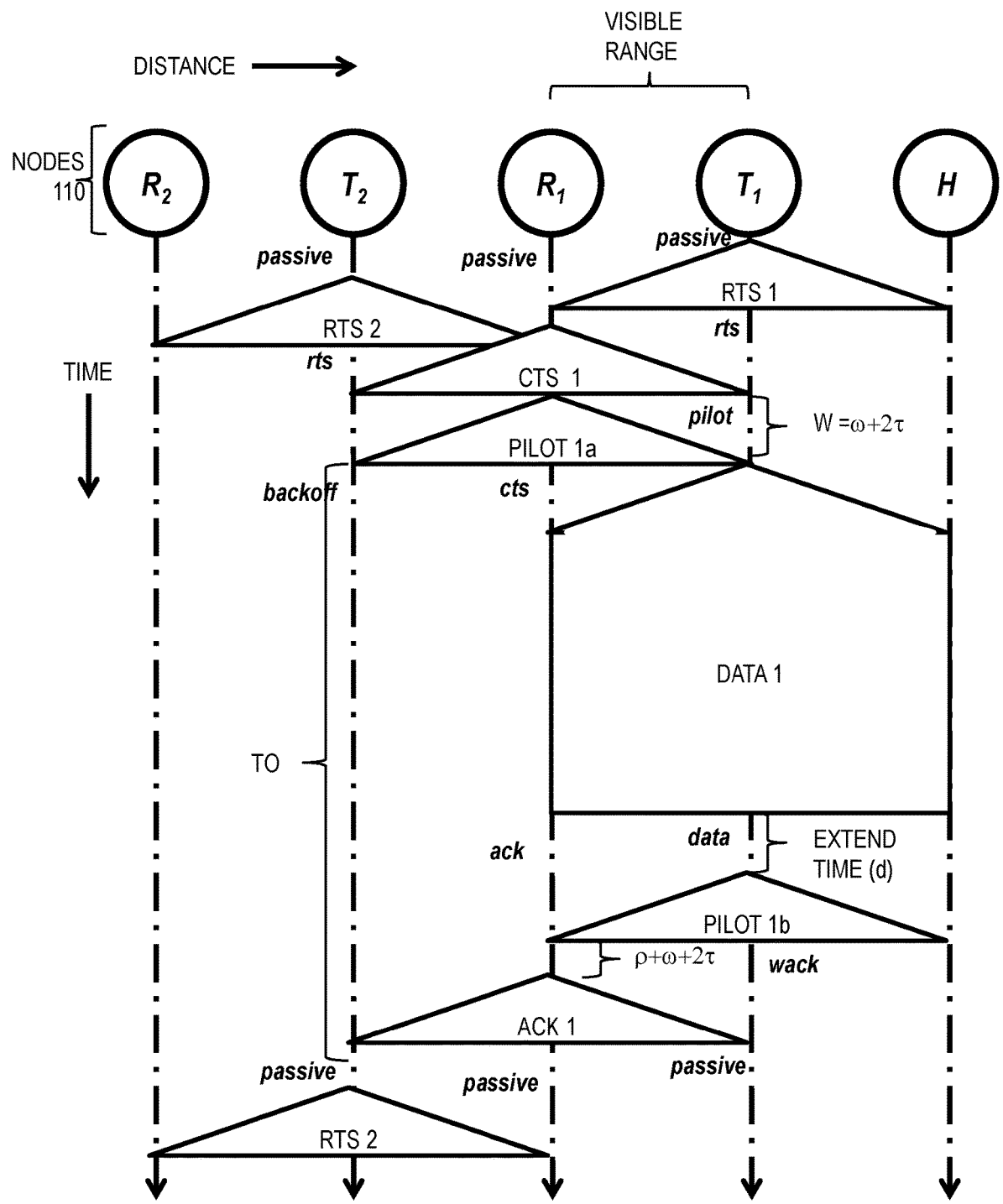
FIG. 3 is a block network message diagram that illustrates an example exchange of messages, according to an embodiment.

FIG. 3 is a block network message diagram that illustrates an example exchange of messages, according to an embodiment. In this embodiment, a receiver $R_1$ at node 110c is in range with two adjacent transmitting nodes $T_1$ and $T_2$ at nodes 110d and 110b, respectively, but the transmitters $T_1$ and $T_2$ are out of range from each other and thus hidden from each other. This illustrates the hidden transmitter problem. This diagram illustrates the cause and effect of a sequence of messages, based on the CSMA/CAP modules 150 in each node in order to avoid collisions with a hidden transmitter. A more detailed embodiment is described in the Examples section, below. As explained in the Examples section, this same cause and effect also serves to avoid collisions with adjacent exposed receivers and adjacent exposed transmitters. FIG. 3 also shows the changing state at each node as a result of the exchange of messages for comparison with the state machine described in the Examples section. State for a given time is indicated by the bold lower case italic words adjacent to a time line associated with each node.

In FIG. 3, distance is indicated by spacing in the horizontal dimension, and time is indicated in the vertical dimension, increasing downward. A message is initiated at one instant at one node and spreads to the one or more adjacent nodes within half duplex visible range, arriving at a later time representing propagation delay. Thus each message is represented by a triangle. Propagation delay is very small, on the order of a microsecond or less. Because propagation delay is so small, the vertical separation is not drawn to scale; and, in similar diagrams in the Examples section, the propagation direction is indicated by horizontal arrows instead of triangles.

Although messages and fields are depicted in FIG. 2 and FIG. 3 as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

In the illustrated example embodiment of FIG. 3, All nodes are assumed to start in a passive state. Two hidden transmitting nodes $T_1$ and $T_2$ each attempt to transmit a different variable length data packet, designated DATA 1 and DATA 2, respectively. $T_1$ gets off its RTS message first, designated RTS 1, and switches to state rts. While that message is propagating to nodes $R_1$ and H, $T_2$ sends its RTS message, designated RTS 2, and switches to state rts.

Node $R_1$ receives RTS 1 first in time and in response sends a clear to send message directed to $T_1$, per the traditional handshake protocol, designated CTS 1. A field in CTS 1 message indicates the sending node $T_1$, and the intended receiver $R_1$ of the data packet. While transmitting CTS 1, node $R_1$ is unable to hear RTS 2. Unlike the traditional handshake, node $R_1$ now also transmits a pilot message, designated PILOT 1a, and transitions to state cts. Transmitting PILOT 1a makes the channel around node $R_1$ appear busy, thus forcing other nodes, such as $T_2$ to back off if that other node has a local data packet to send and prevents the other node (e.g., $T_2$) from being able to complete a collision avoidance handshake successfully. Meanwhile, node $T_1$ has the chance to receive the message CTS 1.

When node $T_1$ receives the message CTS 1, node $T_1$ goes into the pilot state and waits an amount of time $W=\omega+2\tau$ sufficient to complete transmission of PILOT 1a. Recall $\omega$ is the turnaround time and $\tau$ is the propagation delay. After receipt of PILOT 1a, T1 starts transmitting variable length data in a variable length data packet designated DATA 1. After data transmission, node $T_1$ is in the data state.

Meanwhile, node $T_2$ in the rts state receives CTS 1 that is not directed to itself, node $T_2$. Thus node $T_2$ does not transition to the pilot state; but, instead stays in the rts state. Unlike the traditional handshake, upon receiving the PILOT 1a message, node $T_2$ transitions to a backoff state and computes a backoff time (TO) to allow a random amount of time longer than a sum of a transmit time of a longest data packet allowed and a transmit time of an acknowledgement message and a longest propagation time $\tau$ between non-hidden nodes. The random component helps to avoid collisions with different hidden transmitters in range of node $R_1$. After time TO, node $T_2$ returns to the passive state, and determines if it, node $T_2$, still has data to transmit. If so, node $T_2$ sends the RTS 2 message again.

Node $T_1$ in the data state, unlike the traditional handshake, waits an extend time d and then sends a pilot message PILOT 1b. The extend time d is selected so that a sum of the extend time delay and a transmit time for the variable length data message is equal to a transmit time of a longest data packet allowed. The node $T_1$ then transitions to a wait for acknowledgement state, wack. Node $R_1$ in the ack state, ignores any other messages, and waits for the PILOT 1b message from the current transmitting node $T_1$. Upon receipt, the node $R_1$ sends an acknowledgement message ACK 1 indicating the complete transmission was successfully received from node $T_1$. When ACK 1 is received, node $T_1$ transitions back to the passive state. If no ACK 1 is received, then node $T_1$ goes into the backoff state as described above for node $T_2$.

2. Example Embodiments

One or more example embodiments are described in greater detail here, including a state machine that more generally combines all the functionality for any node to perform as the intended transmitter $T_1$ or intended receiver $R_1$ or the other or hidden transmitter $T_2$ or the other or hidden receiver $R_2$ or other hidden node H. This section includes proofs why the method avoids errors due to hidden transmitters and exposed transmitters or receivers for purposes of understanding; however, the scope of the invention is not limited by the completeness or accuracy of the provided proofs. This section also gives estimates of performance, showing that the performance compares favorably with other less capable methods. Statements made in this section apply only to the one or more embodiments described in this section.

Ad-hoc networks based on nodes endowed with a single half-duplex radio and operating in a single channel are likely to be the preferred choice for some time due to cost considerations and design complexity. In this light, it is important to point out that no prior channel-access protocol has been proposed to date that eliminates MAI on transmitted data packets and their acknowledgments (ACK) in the presence of hidden terminals while using a single half-duplex transceiver per node.

Many approaches have been developed over the years to limit or eliminate the negative effects of multiple-access interference (MAI) due to hidden terminals. These approaches can be classified into collision-avoidance schemes (e.g., [3], [5]) and busy-tone schemes (e.g., [8], [10], [14]). A few approaches have also been advanced to emulate collision detection using half-duplex radios [4], [9] in fully-connected wireless networks. Lastly, some approaches have been proposed based on full-duplex radios or self-interference cancellation (SIC) at the physical layer to support full-duplex communication or implement collision detection [6].

One of the first channel-access protocols based on collision avoidance (CA) handshakes was Multiple Access with Collision Avoidance (MACA) [12], which consists of a transmitter sending a request-to-send (RTS) packet to an intended receiver and the receiver sending a clear-to-send (CTS) packet if the RTS is successful. MACA does not use carrier sensing and its performance degrades in the presence of hidden terminals. Many subsequent variants of channel-access protocols based on CA handshakes have been proposed and analyzed since the introduction of MACA and have integrated carrier sensing together with CA handshakes. In some schemes the transmitter initiates the handshake [3] and in others the receiver does [5]. The IEEE 802.11 distributed coordination function (DCF) is arguably the most popular example of combining carrier sensing with the RTS-CTS handshake followed by a data packet and an ACK in successful cases.

Figure 4A:
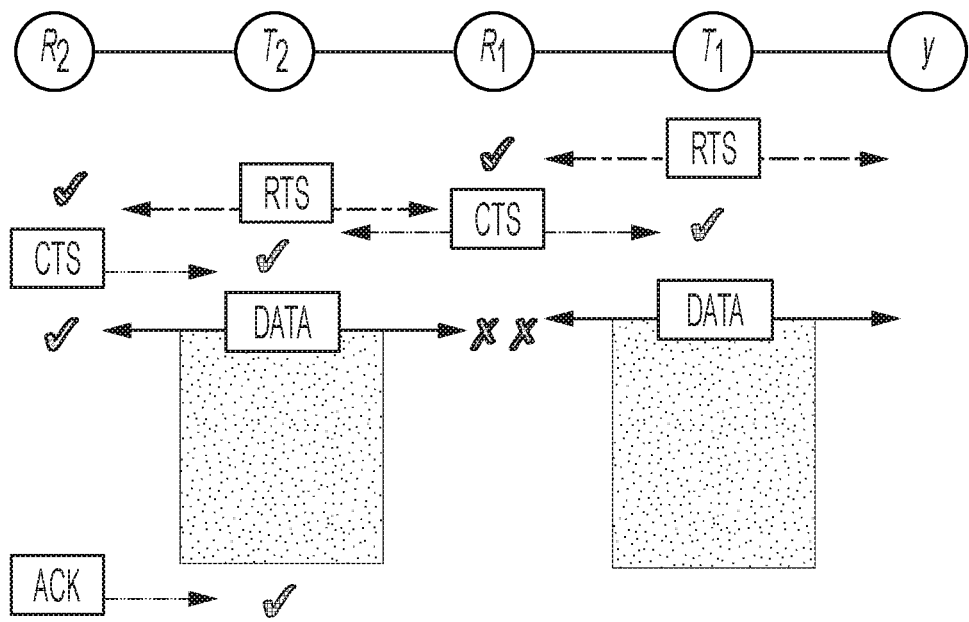
FIG. 4A is a block network message diagram that illustrates collision in an exchange of messages according to prior art CSMA/CA.

FIG. 4A is a block network message diagram that illustrates collision in an exchange of messages according to prior art CSMA/CA. Although CSMA/CA is intended to cope with hidden-terminal interference, collisions can occur in multi-hop ad hoc networks if the duration of a CTS is similar to the duration of an RTS. In the example, transmitter T2 sends its RTS to R2 while the CTS from R1 is being received. Because the RTS and the CTS last roughly the same time, T2 does not hear the carrier of the CTS from R1, receives the CTS from R2 and transmits its data packet, which collides at R1 with the data packet sent by T1. Y corresponds to an additional node that may be adjacent to one or more nodes in the network.

Figure 4B:
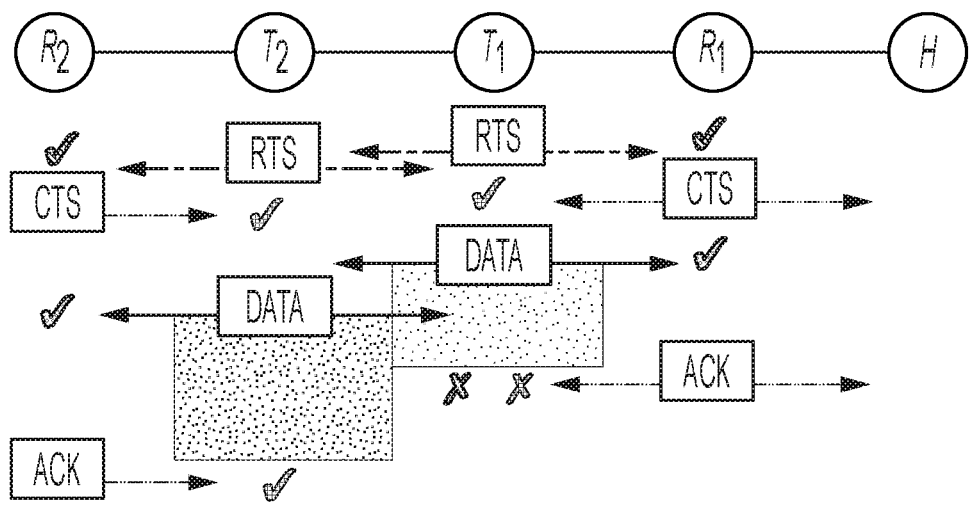
FIG. 4B is a block network message diagram that illustrates multiple access interference (MAI) in an exchange of messages according to prior art CSMA/CA.

FIG. 4B is a block network message diagram that illustrates multiple access interference (MAI) in an exchange of messages according to prior art CSMA/CA. In the example, sources $T_1$ and $T_2$ each send an RTS around the same time. Each source receives a CTS from the intended receivers, and the data packet from $T_2$ lasts much longer than the data packet from $T_1$. The problem is that, although receivers $R_1$ and $R_2$ receive the data packets without MAI, the data packet from $T_2$ interferes with the ACK from $R_1$ needed by $T_1$. A similar MAI problem arises with exposed receivers (e.g., interchanging $R_1$ and $T_1$, and $R_2$ and $T_2$). In such a case, the ACK from one receiver, say $R_1$, interferes with a longer data packet being received by a neighboring receiver, say $R_2$.

The only known CA handshake that has been shown to avoid MAI from hidden terminals while operating in a single channel requires that the CTS from a receiver be much longer than the length of an RTS in order to serve as a busy tone detected by hidden senders that transmitted a RTS concurrently with a CTS [3]. However, this approach does not work correctly when an ACK is used as part of the CA handshake and data packets have variable length. For example, the same interference from exposed transmitters can occur even with CTS packets that are much longer than RTS packets.

The Busy-Tone Multiple Access (BTMA) [14] protocol eliminates multiple-access interference around a central receiver. The available channel is partitioned into a data channel and a busy-tone channel. The central receiver has radio connectivity with all other nodes in the system and transmits a busy tone over the busy-tone channel as soon as it detects carrier in the data channel resulting from transmissions from any subset of transmitters. A number of subsequent approaches based on one or multiple busy tones, also called carrier tones, have been proposed (e.g., [10]), and some of them ensure that ACK packets are received without MAI and even emulate collision detection [8]. The performance of a few of these approaches is much better than that of CSMA/CA; however, all busy-tone approaches require one or two additional control channels, and the corresponding number of additional transceivers operating concurrently.

A few approaches have been proposed based on full-duplex transceivers, and an approach to use collision avoidance and detection in CSMA was recently proposed [6] assuming the use of self-interference cancellation (SIC) at the physical layer. While this approach is promising given that the technologies needed for full-duplex transceivers and SIC are evolving rapidly, many ad-hoc networks today require the use of half-duplex transceivers. A few proposals have been reported on how to emulate CSMA/CD using half-duplex radios (e.g., [4], [9]) but they work correctly only in fully-connected wireless local area networks (WLAN).

2.1 CSMA/CAP and State Machine

CSMA/CAP is an example embodiment that assumes the combined use of carrier sensing based on energy detection and preamble detection, given that both techniques are well established today. Energy detection consists of comparing the signal strength readings obtained from the radio front end (the Received Signal Strength Indicator or RSSI reading) and a carrier-sense threshold used as the noise floor corresponding to the channel being idle. A node determines that the channel is busy when the instantaneous RSSI reading is larger than its carrier-sense threshold. Preamble detection uses the fact that each transmission begins with a common preamble sequence used as part of the physical-layer convergence procedure (PLCP) framing, such that there is a high likelihood a transmission is taking place if the radio decodes a preamble.

CSMA/CAP extends the CA handshake in IEEE 802.11 by introducing pilots transmitted by a receiver after it sends a CTS and after a sender transmits a data packet. A pilot is simply a bit pattern sent as a PLCP frame that can be used at the physical layer to detect the presence of either a single pilot or multiple pilots using energy detection and preamble detection. The length of a pilot is denoted by $\rho$. A pilot could be a PLCP preamble consisting of a synchronization field and a frame delimiter field indicating the end of the PLCP frame. For example, according to the IEEE 802.11 specifications, the length of such a pilot for a direct sequence spread spectrum (DSSS) physical layer would be 144 bits, and the transmission time of such a pilot is longer than a propagation delay and a turnaround time in a typical scenario.

The length the MAC header of a CTS and ACK in IEEE 802.11 is 14 bytes while the length of the MAC header of an RTS is 20 bytes and each packet also has a PLCP header. Accordingly, for convenience, it is assumed that the length of all these packets is the same and denote it by $\gamma$. It is also assumed that a pilot lasts $\rho = 2(\tau+\omega)$, where $\tau$ is the maximum propagation delay and $\omega$ is the turnaround time. It is shown subsequently that this pilot length ensures that any hidden source is forced to back off.

Figure 5A:
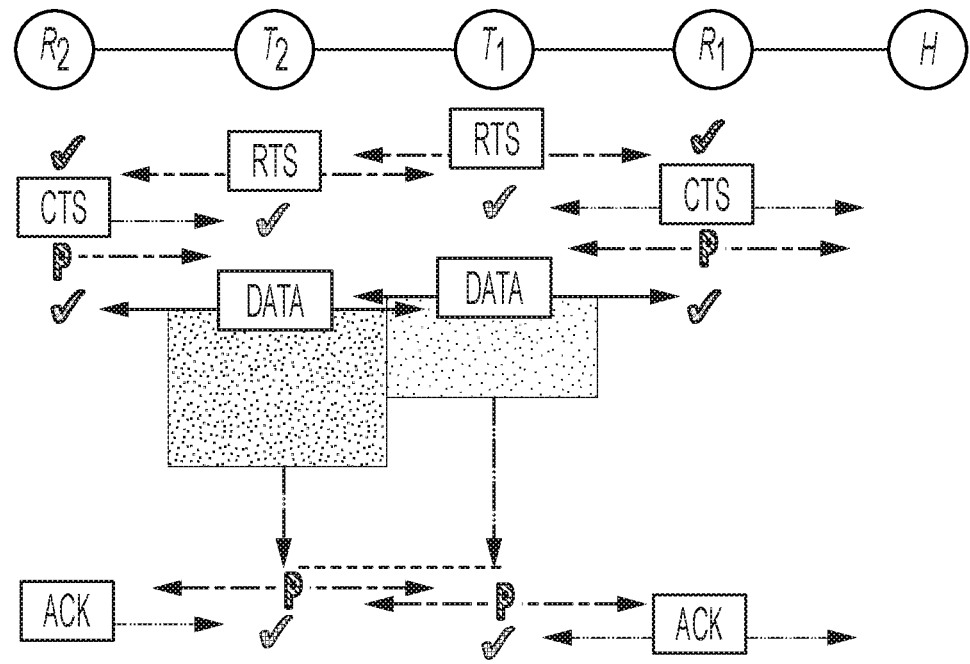
FIG. 5A is a block network message diagram that illustrates eliminating MAI in an CSMA/CAP exchange of messages involving exposed transmitters, according to an embodiment.

The design of CSMA/CAP can be viewed as an improvement on floor acquisition multiple access (FAMA) protocols that allow the use of ACK packets. The intent of requiring the receiver to transmit a pilot after its CTS is to have the pilot act as a "busy tone" around a receiver expecting a data packet. A hidden source that sent an RTS around the same time as the CTS was sent is forced to detect the carrier from the receiver's pilot and back off. FIG. 5A is a block network message diagram that illustrates eliminating MAI in an CSMA/CAP exchange of messages involving exposed transmitters, according to an embodiment. FIG. 5A illustrates the role of pilots in eliminating MAI due to hidden sources using the same example timing as FIG. 4A. In this example, source $T_2$ hidden from source $T_1$ is forced to back off by the carrier produced by the pilot sent by receiver $R_1$ even if it cannot hear the CTS from $R_1$ while transmitting its own RTS.

The intent of requiring the sender of a data packet to transmit a pilot after some delay following its packet transmission is to eliminate MAI in scenarios involving exposed transmitters and exposed receivers. The delay used for the transmission of a pilot by the sender is such that the total time elapsed from the start of its data packet to the end of its pilot equals the transmission time of the longest data packet transmission allowed. Because RTS packets sent by exposed transmitters or CTS packets sent by exposed receivers must occur within a maximum propagation delay of each other, the approach results in data packets being received without MAI from ACK packets or pilots.

Figure 5B:
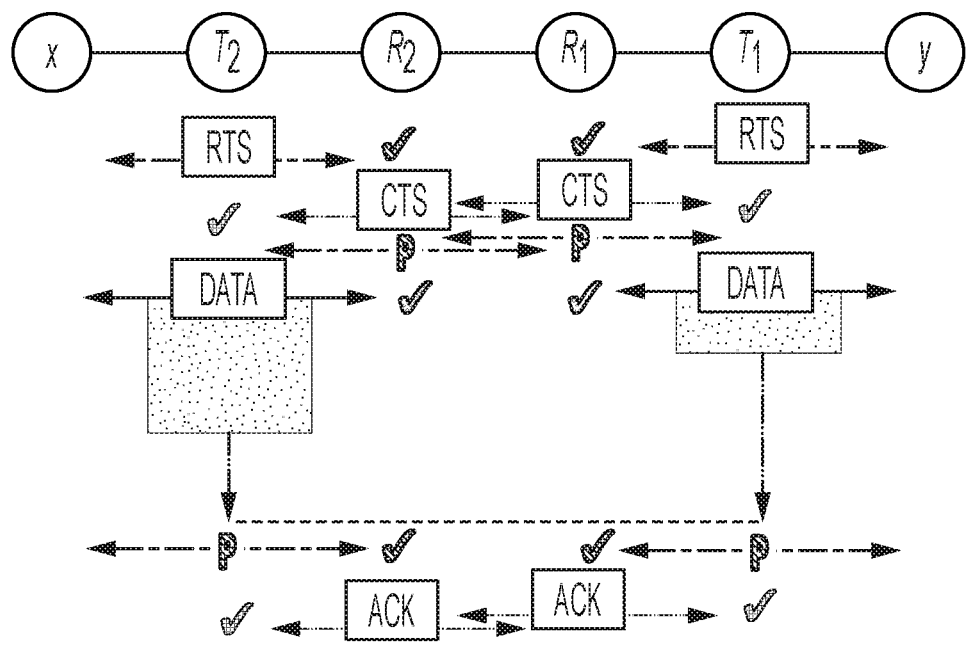
FIG. 5B is a block network message diagram that illustrates eliminating MAI in an CSMA/CAP exchange of messages involving exposed receivers, according to an embodiment.

FIG. 5B is a block network message diagram that illustrates eliminating MAI in an CSMA/CAP exchange of messages involving exposed receivers, according to an embodiment. FIG. 5A illustrates the role of pilots in eliminating MAI due to exposed transmitters using the same example discussed for CSMA/CA; and, FIG. 5B illustrates the role of pilots in eliminating MAI due to exposed receivers. As the figures show, the approach makes all exposed senders (T1 and T2 in FIG. 5A) or hidden senders around exposed receivers (R1 and R2 in FIG. 5B) send their pilots within one propagation delay from each other, which suffices to allow the ACK packets from receivers to arrive without MAI because data packets and ACK packets that may cause MAI at neighboring nodes must be sent within a propagation delay of one another due to the CA handshakes, and a pilot lasts $2(\omega+\tau)$ seconds. X and Y correspond to additional nodes that may be adjacent to one or more nodes in the network.

Figure 6:
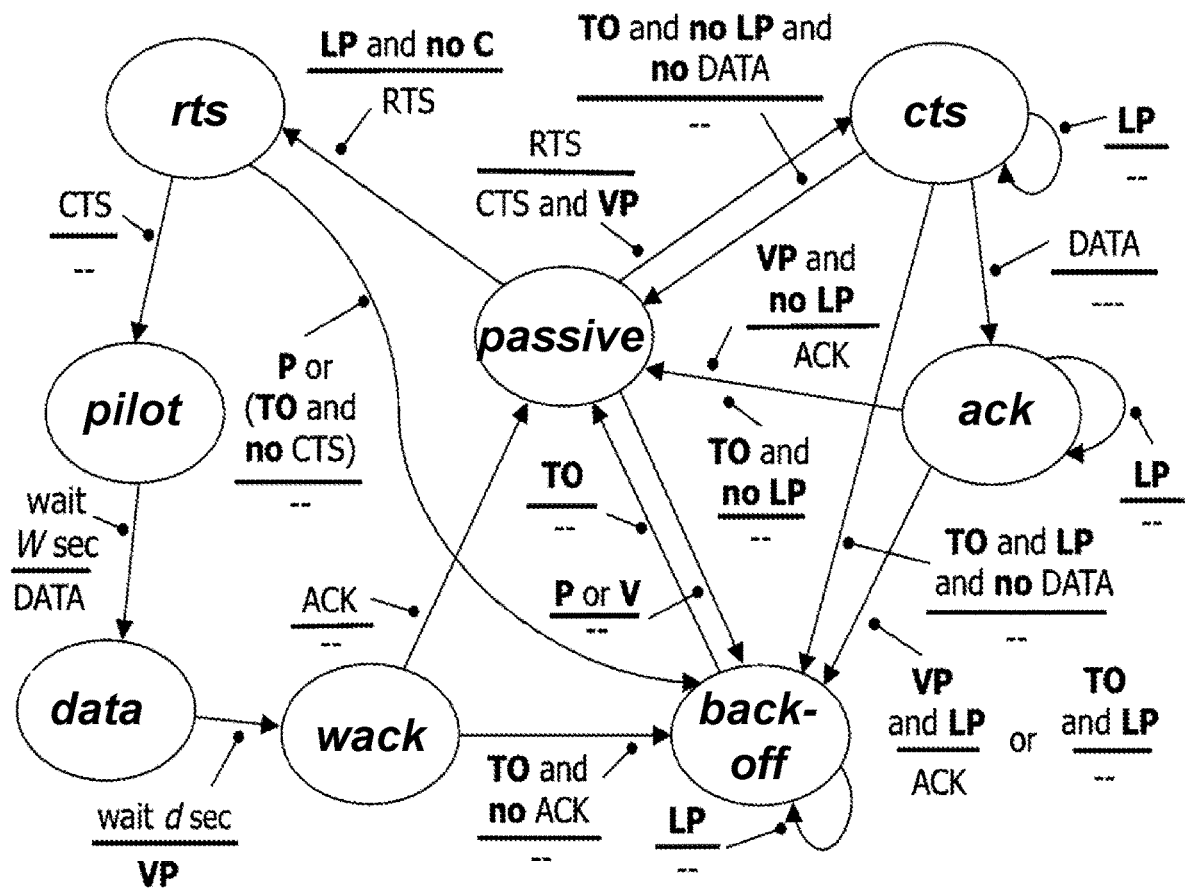
FIG. 6 is a block diagram that illustrates an example state machine for CSMA/CAP assuming a non-persistent transmission strategy, according to an embodiment.

FIG. 6 is a block diagram that illustrates an example state machine for CSMA/CAP assuming a non-persistent transmission strategy, according to an embodiment. It is assumed that a single packet is passed to the MAC layer for transmission.

If a node is in the passive state, then there is no carrier in the channel. When the node has a packet to send (e.g., internally generated or received earlier), then it transmits an RTS and transitions to the rts state to wait for a CTS from the intended receiver. A node in the passive state that receives an RTS for itself transmits a CTS followed by a pilot and transitions to the cts state. Alternatively, if a node in the passive state detects any pilot or a valid packet to some other node, the node transitions to the back-off state. A node in the back-off state computes a random back-off time (TO) and transitions to the passive state after that time has elapsed or the node decodes an ACK. The back-off time is longer than the time needed for the longest allowed data packet and an ACK to be exchanged. A back-off discipline is used to account for unsuccessful retransmission attempts for the same data packet and limit congestion. It is simply assumed that the back-off time is much larger than the time needed for a successful RTS-CTS-pilot-DATA-pilot-ACK transaction to take place.

A node in the rts state transitions to the pilot state if it receives a CTS for itself, and transitions to the back-off state if it receives no CTS after a timeout or detects carrier from a pilot while waiting for a CTS. A node in the pilot state enters the transmission mode and simply waits for a period of time $W=\omega+2\tau$ that is long enough for the receiver to be ready to receive its data after completing the pilot transmission. The node transmits its data packet after that time and transitions to the data state.

Once in the data state, the node simply transmits a pilot after a delay d and transitions to the wack state. The delay d is designed to make the elapsed time from the start of its data-packet transmission to the end of its transmitted pilot equal to the maximum length of a data-packet transmission.

A node in the wack state transitions to the passive state if it receives an ACK packet from the receiver of its data packet. Alternatively, it transitions to the back-off state if it receives no ACK after a timeout.

A node in the cts state remembers whether a local packet is ready for transmission while in that state. The node transitions to the ack state if it receives a data packet for itself from the remote sender. Alternatively, the node transitions to the passive state if it receives no data packet from the remote sender after a timeout and it has no local packet to send; or, the node transitions to the back-off state if it has a local packet to send.

If a node receives a valid pilot once it is in the ack state, the node waits for $\tau+\omega+2\tau$ seconds before transmitting its ACK to the sender; and, then transitions to the passive state if it has no local packet to transmit, or to the back-off state if it has a local packet to transmit. The waiting time is used to prevent collisions of ACK packets at the sender. Alternatively, the node transitions to the back-off state after a timeout period if it does not receive a valid pilot.

2.2 Proofs

The scope of the invention is not limited by the completeness or accuracy of the provided proofs. The following assumptions are made to prove the correctness of CSMA/CAP: (a) A node knows the addresses of its neighboring nodes through some means external to the channel-access protocol, and node connectivity does not change; (b) nodes execute the protocol correctly; (c) the propagation delay $t_p$ between any two neighboring nodes is $0<t_p\leq\tau$ and each transmission from a node can be detected by each of its neighbors; (d) the transmit-to-receive and receive-to-transmit turn-around times are at most $\omega$ seconds, and the time needed to detect carrier based on energy detection is $\xi<\omega$; (e) the transmission time of a pilot is $\rho$ seconds; and (f) the transmission time of a data packet or a signaling packet consists of a physical-layer portion and a medium-access control (MAC) portion.

The following theorem shows that CSMA/CAP prevents MAI on data packets and ACK's even in the presence of hidden terminals, exposed transmitters or exposed receivers.

Theorem 1. CSMA/CAP ensures that no data packets or their ACK packets collide with any other transmissions.

Proof. For a data packet from transmitter T to be sent to receiver R, a successful pilot-based CA handshake must first take place between T and R. This implies that T must be able to send an RTS, R must receive the RTS from T free of collisions, and T must receive the CTS from R free of collisions as well as the pilot from R. Accordingly, the rest of the proof must show that, if a handshake succeeds between T and R up to the reception of a CTS and a pilot at the transmitter T, any neighbor of T or R must back off long enough to allow the data and ACK to be sent between T and R without MAI.

Figure 7:
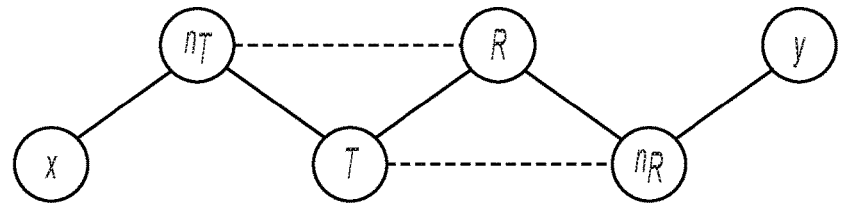
FIG. 7 is a block network diagram that illustrates an example type of MAI that can be avoided, according to an embodiment.

FIG. 7 is a block network diagram that illustrates an example type of MAI that can be avoided, according to an embodiment. The type of potential MAI depicted in FIG. 7 can be experienced by T and R from neighboring nodes. Solid lines indicate radio connectivity and dashed lines indicate possible radio connectivity. Node $n_R$ is a neighbor of R other than T and $n_R$ may be connected to or hidden from T. Node $n_T$ is a neighbor of T other than R and $n_T$ may be connected to or hidden from R. Nodes x and y are neighbors of $n_T$ and $n_R$, respectively, which may cause $n_T$ and $n_R$ to create interference at T or R. The proof of this theorem follows directly from the following two lemmas.

Lemma 1. CSMA/CAP ensures that data packets are received without MAI.

Lemma 1 Proof. According to the operation of CSMA/CAP, R can receive a data packet from transmitter T only after it sends a CTS and a pilot to T. Therefore, the proof must assume that R sends its CTS and pilot to T. Let $t_r$ be the time when R starts transmitting its CTS. Because R sends its CTS, a neighbor $n_R$ can cause MAI on the data packet from T only by starting a new CA handshake (Case 1) or by responding to a handshake initiated by another node (Case 2).

Lemma 1 Proof Case 1. Assume that $n_R$ starts a new CA handshake by transmitting an RTS at time $t_{nr}$. The RTS from $n_R$ arrives in its entirety at R at time $t_{nri}$. By assumption, $n_R$ transmits its CTS at time $t_r$; hence, $t_{nri}\leq t_r+\omega+\tau$, because the turnaround time is $\omega$ and propagation delays are at most $\tau$. Accordingly, Expression 1 holds.

$$t_{nri}\leq t_{nr}+\gamma+\tau\leq t_r+\gamma+\omega+2\tau \quad (1)$$

Node R cannot listen to the channel while sending its CTS followed by its pilot. Hence, given that $\rho=2(\omega+\tau)$, the earliest time $t_{cts}$ when node R could detect an RTS from $n_R$ is given by the equation in Expression 2.

$$t_{cts}=t_r\rho+\gamma=t_r\gamma+2\omega+2\tau \quad (2)$$

From Equation 1 and Equation 2, $t_{cts}>t_{nri}$ and the RTS from $n_R$ cannot disrupt R. On the other hand, $n_R$ must back off if it detects carrier after sending its RTS and is unable to decode a CTS from its intended receiver. Also, for $n_R$ to decode such a CTS, it must arrive without any MAI from the CTS sent by R. Let $t_{inr}$ be the time when the entire CTS and pilot from R are received at $n_R$ and let $t_{cnr}$ be the time when $n_R$ starts listening for carrier after sending its RTS. Neighbor $n_R$ can detect the carrier of the CTS from R starting at $t_r+\tau$ and hence it can start its RTS no later than $t_r+\tau+\omega$. Given that an RTS lasts $\gamma$ and that $n_R$ starts listening to the channel after a turnaround delay, Expression 3 follows.

$$t_{cnr}\leq t_r\gamma+(\tau+\omega)+\omega=t_r+\gamma+2\omega+\tau \quad (3)$$

However, given that propagation delays are non-zero, the carrier created by the CTS and pilot from R must persist at $n_R$ until time $t_{inr}$ given by Expression 4.

$$t_{inr}>t_r\gamma+\rho=t_r+\gamma+2\omega+2\tau \quad (4)$$

It follows from Equation 3 and Equation 4 that $t_{inr}>t_{cnr}$ and hence the CTS and pilot from R must force $n_R$ to back off, which means that $n_R$ cannot cause MAI on the data packet sent to R if it starts a CA handshake.

Lemma 1 Proof Case 2. Assume that $n_R$ responds to a CA handshake. Because R starts sending its CTS at time $t_r$ by assumption, $n_R$ can respond to a CA handshake only by starting a CTS no earlier than $t_r-(\tau+\omega)$ and no later than $t_r+(\tau+\omega)$, for otherwise either R could not send its CTS at time $t_r$ or $n_R$ would detect carrier. Let $t_{rd}$ be the time when R starts receiving the data packet from T, and $t_{rp}$ be the time when the entire pilot from $n_R$ has arrived at R. Because propagation delays are non-zero and T waits $\omega+2\tau$ seconds to send its data packet after receiving a pilot from R, $t_{rd}$ is given by Expression 5.

$$t_{rd} > t_r + \gamma + \rho + \omega = 2\tau = t_r + \gamma + 3\omega + 4\tau \quad (5)$$

On the other hand, because propagation delays are non-zero and the pilot from $n_R$ starts at most $\omega+\tau$ seconds after the pilot from R starts, $t_{rp}$ is given by Expression 6.

$$t_{rp} \leq t_r + \gamma + \rho + (\omega+\tau) + \tau = t_r + \gamma + 3\omega + 4\tau \quad (6)$$

It follows from Expression 5 and Expression 6 that $t_{rd} > t_{rp}$ and hence the pilot from $n_R$ sent after its CTS cannot interfere with the data packet from T at R.

Let $t_{tep}$ be the time when T stops transmitting its pilot following its data packet, and let $t_{nep}$ be the time when a neighbor H of $n_R$ stops transmitting its pilot following its data packet to $n_R$. Because the time between the start of a data packet and the end of the pilot following the packet transmission must equal a maximum-allowed data-packet transmission time $\delta$, it must be true that $t_{nep}$ is given by Expression 7a.

$$t_{nep} > t_{tep} - (\omega+2\omega) \quad (7a)$$

Let $t_{nak}$ be the time when the ACK from $n_R$ starts arriving at R and $t_{rp}$ be the time when the pilot from T arrives completely at R. Because propagation delays are non-zero and $n_R$ must wait $\rho+\omega+2\tau$ seconds before sending its ACK to H, Expression 7b holds.

$$t_{nak} > t_{nep} + \rho + \omega + 2\tau > t_{tep} + 2\omega + 3\tau \quad (7b)$$

On the other hand, because propagation delays are at most $\tau$, Expression 8 holds.

$$t_{rp} \leq t_{tep} + \rho + \tau = t_{tep} + 2\omega + 3\tau \quad (8)$$

It follows from Expression 7b and Expression 8 that $t_{nak} > t_{rp}$ and hence the ACK from $n_R$ sent to its neighbor H cannot interfere with the pilot sent from T to R. Therefore, both cases are satisfied; and, lemma 1 is true.

Lemma 2. CSMA/CAP ensures that ACK packets are received without MAI.

Lemma 2 Proof. According to the operation of CSMA/CAP, sender T can send an ACK to R only after receiving the data packet and pilot from T. Let $t_s$ be the time when T completes transmitting its pilot following the data packet sent to R, and let $t_{ack}$ be the time when T starts receiving the ACK from R. As shown next, it follows from Lemma 1 that R must receive the pilot from T without any MAI.

Neighbor $n_T$ can only interfere with the ACK received by T with a data packet and pilot transmission. Let $t_{ntp}$ be the time when the end of a pilot from $n_T$ arrives at T. According to the operation of CSMA/CAP, $n_T$ must start its transmission no later than $\omega+\tau$ seconds after T starts its own transmission; otherwise, $n_T$ would detect the carrier from T, which corresponds to an invalid pilot forcing $n_T$ to back off. Furthermore, the time elapsed, from the start of the data packet and the end of the pilot sent by T and any source, corresponds to one maximum data-packet transmission time $\delta$. Accordingly, given that propagation delays are at most $\tau$ seconds, Expression 9 holds.

$$t_{ntp} \leq t_s + (\omega+\tau) + \tau = t_s + \omega + 2\tau \quad (9)$$

Because propagation delays are non-zero and R waits $\rho+\omega+2\tau$ seconds before sending its ACK, Expression 10 holds.

$$t_{ack} > t_s + \rho + \omega + 2\omega + 2\tau \quad (10)$$

It follows from Expression 9 and Expression 10 that $t_{ack} > t_{ntp}$ and hence the pilot from $n_T$ cannot interfere with the ACK from R received by T. Therefore, Lemma 2 is true.

2.3 Performance

This section addresses example performance advantages of the CSMA/CAP embodiment. The non-persistent version of CSMA/CAP is analyzed and compared against CSMA with priority ACKs using the traffic model first introduced by Kleinrock and Tobagi [13]. Two scenarios are considered. In the first scenario, a fully-connected network is used to illustrate the greatest additional overhead introduced by CSMA/CAP when no hidden terminals are present. In a second scenario, to illustrate the importance of eliminating collisions in the presence of hidden terminals, a star configuration network is used in which all sources transmit to a central receiver and all sources are hidden from each other.

In both scenarios, there is a large number of stations modeled as a Poisson source sending data packets or RTS packets to the shared channel with an aggregate rate of $\lambda$ packets per unit time. Each node is assumed to have at most one data packet to send at any time, and a node retransmits after a random retransmission delay that on the average is much larger than the time needed for a successful transaction between a transmitter and a receiver and such that all transmissions of RTS packets or data packets can be assumed to be independent of one another. The channel is assumed to introduce no errors, so multiple access interference (MAI) is the only source of errors. Nodes are assumed to detect carrier or busy tones perfectly, and the probability of false busy-tone detection is 0.

It is further assumed that there is no power capture by any transmission; and, hence, two or more transmissions that overlap in time in the channel must all be retransmitted, and that any packet propagates to all nodes in exactly $\tau$ seconds. Times are given in number of clock cycles, also called bit times. The transmit-to-receive and receive-to-transmit turn-around times in the data channel required by a node is $\omega$ and is assumed to be larger than the propagation delay $\tau$, which agrees with the parameters assumed in IEEE 802.11 DCF. The transmission time of an ACK packet, an RTS packet, or a CTS packet is $\gamma$. In IEEE 802.11, the actual length of a CTS or an ACK is slightly shorter than the length of an RTS, but only by a few bit times, which does not impact the analysis. The maximum data transmission time allowed in CSMA/CAP is $\delta$ and a data-packet length is at most $\delta$.

It is further assumed that processing delays are negligible, which includes the time $\xi$ to detect carrier. The protocols are assumed to operate in steady state, with no possibility of collapse, and hence the average channel utilization of the channel is given by [13] and repeated here as Expression 11.

$$S = \frac{U}{B+I} \quad (11)$$

where $\overline{B}$ is the expected duration of a busy period (defined to be a period of time during which the channel is being utilized), $\overline{I}$ is the expected duration of an idle period (defined as the time interval between two consecutive busy periods), and $\overline{U}$ is the time during a busy period that the channel is used for transmitting user data successfully. All these assumptions are useful without loss of generality for determining relative performance compared to existing protocols.

2.3.1 A Fully-Connected Scenario

Figure 8:
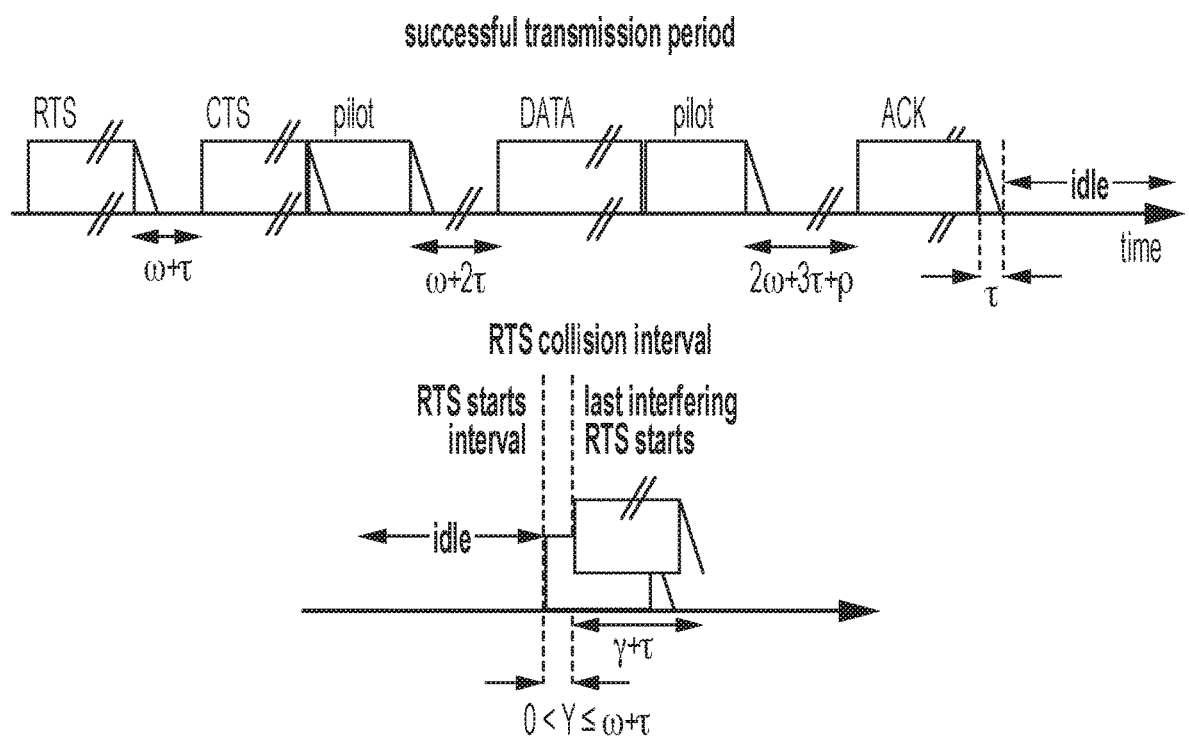
FIG. 8 is a block time diagram that illustrates example idle and busy periods in a fully-connected network, according to an embodiment.

The utilization of the channel with CSMA/CAP in a fully-connected network consists only of idle periods, successful transmission periods during which data packets are sent as part of successful handshakes, or RTS collision intervals (RCI) resulting from the collision of two or more RTS packets. FIG. 8 is a block time diagram that illustrates example idle and busy periods in a fully-connected network, according to an embodiment. Such periods may occur with CSMA/CAP when all nodes are $\tau$ seconds from one another and the length of each data packet is $\delta$. It is assumed that the length of a pilot is $\rho=2(\omega+\tau)$.

Theorem 2. The throughput of a non-persistent CSMA/CAP in a fully-connected network is designated $S_{CAP}$ and given by Expression 12.

$$S_{CAP} = \frac{\delta}{\delta + 2\gamma + 9\omega + 8\tau + \frac{1}{\lambda} + e^{\lambda(\omega+\tau)}(\gamma + \omega + 2\tau)} \quad (12)$$

Proof. A node with a packet to send must first sense the channel before transmitting an RTS, which forces the node to incur a turnaround time $\omega$ during which it is unable to listen to the channel. Therefore, the vulnerability period of an RTS is $\omega+\tau$, and the probability that an RTS is transmitted without interference from other RTS packets is designated $P_S$ and given by Expression 13a.

$$P_S = e^{-\lambda(\omega+\tau)} \quad (13a)$$

If an RTS is sent without MAI, then the intended receiver transmits its CTS back to the sender after receiving the RTS and transmits its pilot immediately following its CTS. The sender gets ready to transmit its data packet immediately after receiving the CTS, which lasts longer than $\omega+\tau$. The sender waits for period designated $W=\rho+\omega+\tau$ after receiving a CTS to allow the receiver to be listening to its data packet. With the assumption that all data packets have the same length, the delay d imposed on the sender to send its pilot can be set and hence the sender transmits its pilot immediately after transmitting its data packet. The receiver sends its ACK to the sender after receiving the pilot from the sender. Accordingly, as FIG. 8 illustrates, the length of a successful exchange lasts an amount of time designated T and given by Equation 13b $$T = \delta + 3\gamma + 3(\rho+\omega+2\tau)+\tau \quad (13b)$$

With the assumptions described above (including $\rho=2(\omega+\tau)$) this becomes Expression 13c.

$$T = \delta + 3(\gamma + 3\omega + 3\tau) \quad (13c)$$

On the other hand, if multiple RTS packets collide with one another as shown in FIG. 8, an RTS collision interval (RCI) designated $t_{RCI}$ is given by Expression 13d, $$t_{RCI} = Y + \gamma + \tau \quad (13d)$$

where Y is a random variable denoting the length of time between the start of the RCI and the start of the last RTS in the interval. A collision interval occurs with probability $1-P_S$. Because arrivals of RTS packets are assumed to be Poisson distributed, no more than one RTS can arrive at any one instant and hence Y=0 can occur only when an RTS is successful. Accordingly, the length of an average busy period, designated $\overline{B}$, is given by Expression 13e.

$$\overline{B} = \overline{Y} + (\gamma + \tau)(1 - e^{-\lambda(\omega+\tau)}) + Te^{-\lambda(\omega+\tau)} \quad (13e)$$
$$= \overline{Y} + \gamma + \tau + e^{-\lambda(\omega+\tau)}(\delta + 2\gamma + 9\omega + 8\tau)$$

Where $\overline{Y}$ is the expected value of Y. If the time period between the start of the first and the last RTS in a collision interval equals y, then there are no more RTS arrivals in the remaining time of the vulnerability period of the first RTS of the collision interval, $\omega+\tau-y$. Accordingly, the probability that Y is less than or equal to y designated $P(Y \le y)$ is given by Expression 14a.

$$P(Y \le y) = F_Y(y) = P\{\text{no arrivals in } \omega+\tau-y\} = e^{-\lambda(\omega+\tau-y)} \quad (14a)$$

Therefore, given that Y assumes only nonnegative values, the average (expected) value for Y, designated $\overline{Y}$, is given by Equation 14b.

$$\overline{Y} = \int_0^\infty (1 - F_Y(t))dt = \int_0^{\omega+\tau}(1 - e^{-\lambda(\omega+\tau-t)})dt \quad (14b)$$
$$= \omega + \tau - \frac{1 - e^{-\lambda(\omega+\tau)}}{\lambda}$$

Substituting Expression 14b into Expression 13e, produces Expression 14c.

$$\overline{B} = e^{-\lambda(\omega+\tau)}\left(\delta + 2\gamma + 9\omega + 8\tau + \frac{1}{\lambda}\right) + \gamma + \omega + 2\tau - \frac{1}{\lambda} \quad (14c)$$

The average length of an idle period $\overline{I}$ is simply the average inter-arrival time of packets, which are preceded by pilot transmissions, and this equals $1/\lambda$ because inter-arrival times are exponentially distributed with parameter $\lambda$. The average time period used to transmit useful data $\overline{U}$ is the useful portion of a successful busy period, which occurs with probability $e^{-\lambda(\omega+\tau)}$. Accordingly, $\overline{U} = \delta e^{-\lambda(\omega+\tau)}$.

Substituting the values of $\overline{U}$, $\overline{B}$, and $\overline{I}$ into Expression 11 produces Expression 12, thus proving Theorem 2.

2.3.2 Hidden Terminal Scenario

In this scenario all traffic is sent to a central receiver r (e.g., $R_1$ node 110c); and, all nodes other than r are hidden from one another. First the performance of non-persistent CSMA/CAP is described; then the performance of the prior art CSMA with ACK packets is described for comparison.

2.3.2.1 Non-Persistent CSMA/CAP with Hidden Terminals

Figure 9:
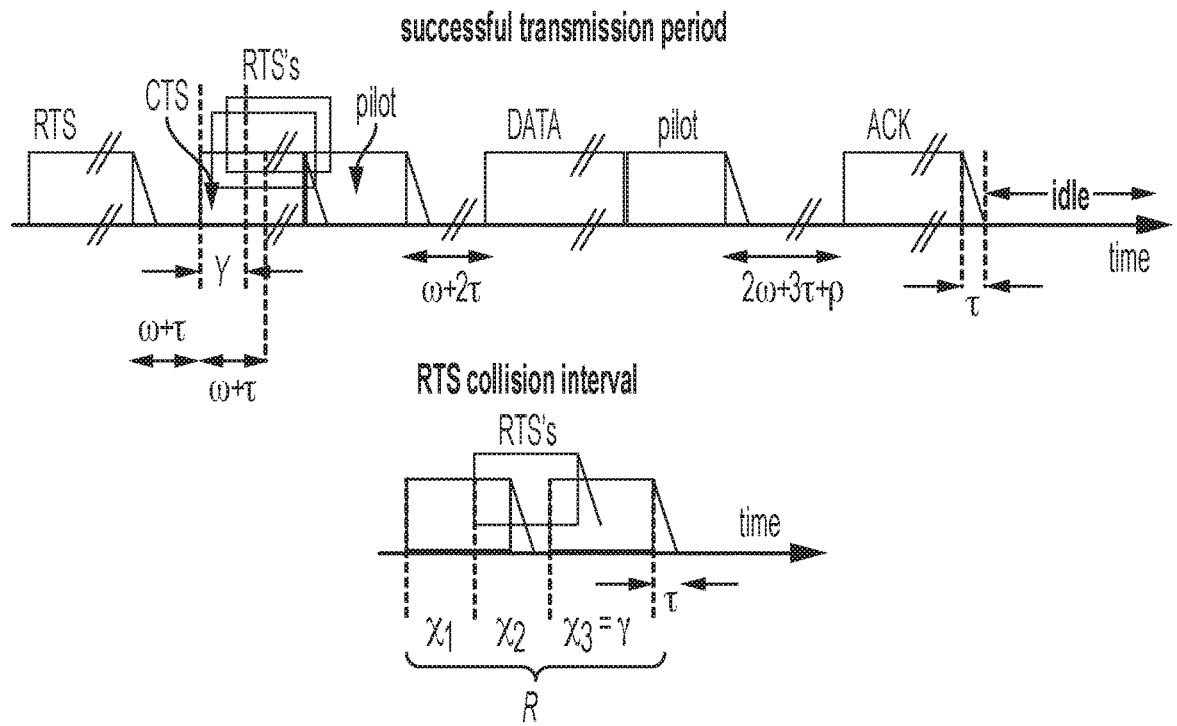
FIG. 9 is a block time diagram that illustrates example collision intervals that may occur in non-persistent CSMA/CAP in a star-network scenario, according to an embodiment.

FIG. 9 is a block time diagram that illustrates example collision intervals that may occur in non-persistent CSMA/CAP in a star-network scenario, according to an embodiment. As the figure shows, the types of transmission periods that may occur in CSMA/CAP with the assumptions made are: successful CA handshakes; RTS collision intervals; and idle transmission periods. The following theorem provides the throughput of CSMA/CAP.

Theorem 3. The throughput $S_{CAP}$ of non-persistent CSMA/CAP at a central receiver r with a very large population of sources hidden from each other is given by Expression 15.

$$S_{CAP} = \frac{\delta}{\delta + 3\gamma + 9(\omega+\tau) + \frac{1}{\lambda} + e^{\lambda\gamma}\left[\tau + \frac{1}{\lambda}(e^{\lambda\tau} - 1)\right]} \quad (15)$$

Proof Theorem 3. A busy period is either an RTS collision interval or a successful CA handshake as illustrated in FIG. 9. Receiver r receives an RTS without MAI if no other RTS is sent during its transmission because all sources are hidden from one another. Therefore, a successful handshake of T bit times occurs with probability $P_S = e^{-\lambda\gamma}$.

If r obtains an RTS without MAI from a given neighbor, r can transmit a CTS to that neighbor and receive its data packet without MAI even when other neighbors transmit RTS packets to r concurrently. This is because the additional RTS packets sent to r must be transmitted within $\tau+\omega$ of the start of the CTS from r, after which all neighbors of r must detect carrier from the CTS. Once receiver r starts transmitting its CTS, it is unable to hear any transmission from hidden sources until $\omega$ seconds after it stops transmitting its pilot. Therefore, given that r ends the transmission of its pilot after all RTS packets from hidden sources arrive at r, none of those RTS packets is heard by r. On the other hand, the neighbors of r are hidden from each other; and, the neighbor that sent the first RTS is able to decode the CTS from r successfully. As a result, if an RTS is sent without MAI with probability $P_S$, then the length of time Y between the CTS send by r and the last RTS sent to r concurrently (see FIG. 9) has no impact on the success of the CA handshake or the duration of the busy period. Accordingly, a successful transmission period has the same length as in the fully-connected scenario given in Expression 13c, and alternatively as Expression 16.

$$T = \delta + 3\gamma + 9\omega + 9\tau \quad (16)$$

An RTS collision interval (RCI) consists of a sequence of complete RTS transmissions and all the neighbors of receiver r may participate in the RCI. This results from the fact that the vulnerability period of an RTS is its entire transmission time. An RCI takes place if the first RTS of the interval suffers MAI with probability $1-P_S$. Each RCI lasts $\tau+R$ bit times, where R is a random variable whose value depends on the number of RTS packets involved in the collision interval and the inter-arrival times of the RTS packets.

For an RCI to have k RTS packets, there must be an RTS arriving during the transmission time of each of the first k−1 RTS packets and no RTS arriving during the transmission time of the last RTS within the RCI. Given the simplifying assumption of an essentially infinite number of sources around receiver r, this corresponds to the geometric random variable in which the probability of successfully ending the RCI is the probability that no RTS arrives during the $\gamma$ seconds of the RTS transmission, which is $e^{-\lambda\gamma}$. Hence, the average number of RTS packets in an RCI is $e^{\lambda\gamma}$.

The inter-arrival times between consecutive RTS packets in an RCI are exponentially distributed; and, each can be at most $\gamma$ seconds. Therefore, the average of such times is given by Expression 17.

$$\overline{X} = \int_0^\infty [1 - F_X(t)]dt = \int_0^\gamma e^{-\lambda t}dt = \frac{1}{\lambda}(1 - e^{-\lambda\gamma}) \quad (17)$$

It thus follows that the average value of R is given by Expression 18.

$$\overline{R} = e^{\lambda\gamma}\overline{X} = \frac{e^{\lambda\gamma}}{\lambda}(1 - e^{-\lambda\gamma}) = \frac{e^{\lambda\gamma} - 1}{\lambda} \quad (18)$$

The average length of a busy period is simply given by Expression 19a.

$$\overline{B} = Te^{-\lambda\gamma} + (\overline{R}+\tau)(1 - e^{-\lambda\gamma}) \quad (19a)$$

Substituting Expression 16 and Expression 18 into Expression 19a, yields Expression 19b.

$$\overline{B} = e^{-\lambda\gamma}\left(\delta + 3\gamma + 9\omega + 9\tau + \frac{1}{\lambda}\right) + \tau + \frac{e^{\lambda\gamma} - 2}{\lambda} \quad (19b)$$

The proportion of time that the channel is used for data during a successful handshake is $\overline{U} = \delta P_S = \delta e^{-\lambda\gamma}$, and the length of an average idle period is the same as the average inter arrival time of RTS packets $\overline{I} = 1/\lambda$. Substituting the values of $\overline{U}$, $\overline{I}$, and $\overline{B}$ into Expression 11, one obtains Expression 15, thus proving Theorem 3.

2.3.2.2 Non-Persistent CSMA Using ACK Packets with Hidden Terminals

Figure 10:
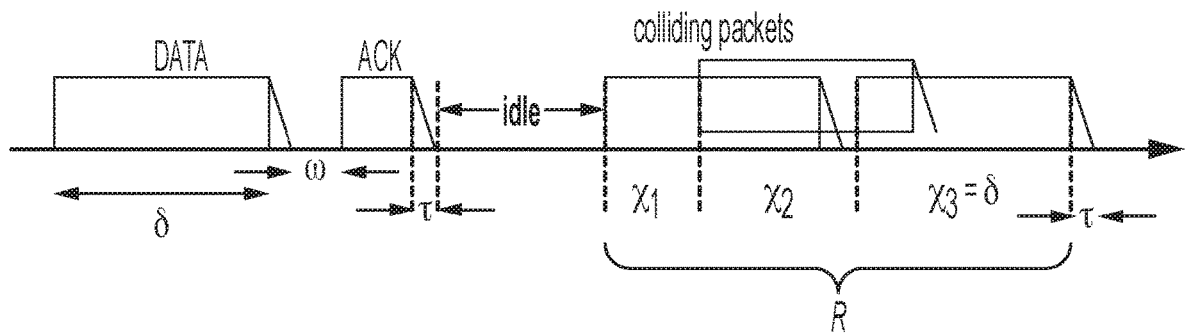
FIG. 10 and FIG. 11 are block time diagrams that illustrate the types of transmission periods that may occur in CSMA with the assumptions of a central receiver and sources hidden from one another.
Figure 11:
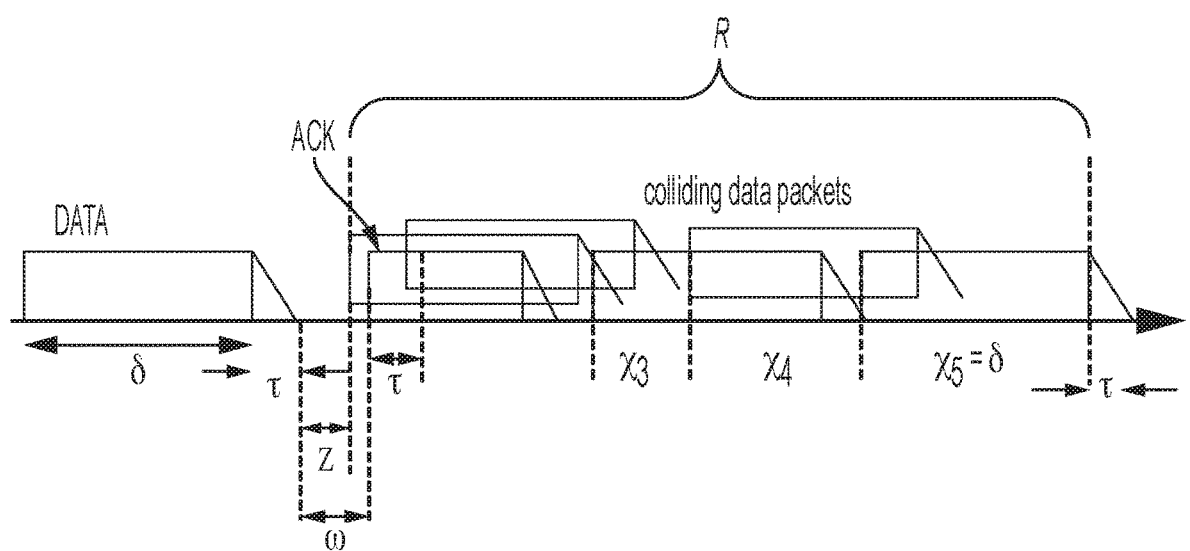

FIG. 10 and FIG. 11 are block time diagrams that illustrate the types of transmission periods that may occur in CSMA with the assumptions of a central receiver and sources hidden from one another, according to a prior approach. As shown in FIG. 10, the types of transmission periods are successful transmissions, collision intervals, and idle transmission periods. However, as shown in FIG. 11, packet transmissions from hidden sources may be sent to the central receiver while the receiver transmits its ACK for a prior data packet received correctly as well as after the ACK is sent. It is assumed that a source with a packet to send that detects carrier from the central receiver simply backs off for a random time that is larger than the time needed to send a packet and its ACK. The following theorem provides the throughput of CSMA with ACK packets under these assumptions.

Theorem 4. The throughput $S_{CSMA}$ of non-persistent CSMA with ACK packets at a central receiver r with a very large population of sources hidden from each other is given by Expression 20a.

$$S_{CSMA} = \frac{\delta}{\delta + 2\tau + \frac{1}{\lambda} + Ue^{\lambda\delta} + Ve^{-\lambda\delta} + (\omega + \gamma)e^{-\lambda(\omega+\tau)}} \quad (20a)$$

Where U and V are defined by Expressions 20b and 20c, respectively.

$$U = \tau + \frac{e^{\lambda\delta} - e^{-\lambda(\omega+\tau)}}{\lambda} \quad (20b)$$

-continued $$V = \frac{e^{-\lambda(\omega+\tau)} - 1}{\lambda} \quad (20c)$$

Proof Theorem 4. To transmit a data packet, a source must first sense the channel. However, because all sources are hidden from each other, the central receiver is able to decode a data packet successfully only if no other data packet is transmitted. Therefore, a successful data packet occurs with probability $P_S = e^{-\lambda\delta}$.

The average length of an idle period $\bar{I}$ is $1/\lambda$ as in the previous protocols, and the average time period used to transmit useful data $\bar{U}$ is simply $\delta P_S = \delta e^{-\lambda\delta}$.

As FIG. 10 and FIG. 11 illustrate, a busy period is either a collision interval (CI) or a successful transmission period. A CI occurs if the first packet of the interval suffers MAI with probability $1 - P_S$. Each CI lasts $R+\tau$ bit times, where $R$ is a random variable whose value depends on the number of packets involved in the CI and the packet inter-arrival times. Hence, the average length of a busy periods is given by Expression 21.

$$\bar{B} = \bar{T}e^{-\lambda\delta} + (\bar{R}+\tau)(1-e^{-\lambda\delta}) \quad (21)$$

$\bar{T}$ is the average length of a successful busy period.

For a CI to have k packets there must be a packet arrival during the transmission time of each of the first k−1 packets, and no arrival during the transmission time of the last packet of the CI. As it was in the proof of Theorem 3, this corresponds to the geometric random variable in which, the probability of successfully ending the CI is the probability that no arrivals occur during the $\delta$ seconds of the last packet transmission in the CI, i.e., $e^{-\lambda\delta}$. Hence, the average number of packets in a CI is $e^{\lambda\delta}$.

The inter-arrival times between consecutive packets in a CI are exponentially distributed and each can be at most $\delta$ seconds. Therefore, the average of such times is given by Expression 22.

$$\bar{X} = \int_0^\infty [1 - F_X(t)]dt = \int_0^\infty e^{-\lambda t}dt = \frac{1}{\lambda}(1 - e^{-\lambda\delta}) \quad (22)$$

Therefore, the average value of R is given by Expression 23.

$$\bar{R} = e^{\lambda\delta}\bar{X} = \frac{e^{\lambda\delta}}{\lambda}(1 - e^{-\lambda\delta}) = \frac{e^{\lambda\delta} - 1}{\lambda} \quad (23)$$

As FIG. 10 and FIG. 11 illustrate, a successful busy period lasts only $\delta+\gamma+\omega+2\tau$ bit times if no data packets are transmitted concurrently with the ACK form the central receiver (see FIG. 10) or much longer if sources transmit data packets concurrently or after the ACK from the central receiver (see FIG. 11). The first case occurs with probability $e^{-\lambda(\omega+\tau)}$, because the receiver incurs $\omega$ bit times of turnaround delay before it sends its ACK, and the ACK itself propagates to all other nodes in $\tau$ bit times; after which nodes detect carrier and must back off if they have data packets to send while the ACK is still being transmitted. The second case of course occurs with probability $1 - e^{-\lambda(\omega+\tau)}$.

FIG. 11 illustrates the case in which data packet transmissions occur concurrently with the ACK transmission from the central receiver r. The busy period is considered from the standpoint of receiver r. Given that source nodes cannot hear one another, the data packets arriving at receiver r cannot interfere with the reception of the ACK at the source node being addressed by r. However, hidden sources may transmit data packets up to $\omega$ seconds before the ACK from r; and transmissions of data packets may continue arriving at r after it finishes transmitting its ACK.

The average length of a successful busy period in which data packets are sent concurrently with the ACK from the central receiver equals $\delta+\tau+Z+R+\tau$, where Z and R are two random variables.

The length of R is determined by the Poisson arrival times of data packets at the central receiver; and hence R is given by Expression 18. The length of random variable Z is the time from the arrival of the successful data packet at receiver r to the arrival at r of the first data packet sent by a hidden source. Hence, it can assume values in the interval $[0, \omega]$ and Z can be computed as in the proof of Theorem 2 and Theorem 3 using Expression 24.

$$\bar{Z} = \int_0^\omega [1 - P(Z \le t)]dt = \int_0^\omega e^{-\lambda t}dt = \frac{1}{\lambda}(1 - e^{-\lambda\omega}) \quad (24)$$

From the above, a successful busy period always starts with a successful data packet that propagates to the central receiver r, followed by either the transmission of an ACK from r with no concurrent data packet transmissions (which occurs with probability $e^{-\lambda(\tau+\omega)}$) or an ACK transmitted concurrently with data packets from other sources (which occurs with probability $1 - e^{-\lambda(\tau+\omega)}$). Accordingly, the average length of a successful busy period is given by Expression 25.

$$\bar{T} = \delta+\tau+e^{-\lambda(\tau+\omega)}(\gamma+\omega+\tau)+(1-e^{-\lambda(\tau+\omega)})(\bar{Z}+\bar{R}+\tau) \quad (25)$$

Substituting Expression 23 and Expression 24 into Expression 25 gives Expression 26.

$$\bar{T} = \delta + 2\tau + e^{-\lambda(\tau+\omega)}\left[\gamma + \omega + \frac{e^{-\lambda\omega}}{\lambda}\right] + \frac{(1-e^{-\lambda\tau})e^{\lambda-\omega}}{\lambda} \quad (26)$$

Substituting Expression 23 and Expression 26 into Expression 21 results in Expression 27 for $\bar{B}$ after some simplification.

$$\bar{B} = \frac{e^{\lambda\delta}-1}{\lambda} + \tau + e^{-\lambda\delta}\left[\delta + 2\tau + \frac{1-e^{-\lambda\omega}}{\lambda}\right] + \quad (27)$$
$$e^{-\lambda\delta}e^{-\lambda(\omega+\tau)}\left[\omega + \gamma + \frac{e^{-\lambda\omega} - e^{-\lambda\delta}}{\lambda}\right]$$

Substituting the values of $\bar{I}$ and $\bar{U}$ from Expression 20b and Expression 20c, respectively, and Expression 27 all into Expression 11 gives Expression 20a, after some simplification, and thus proves Theorem 4.

2.3.3 Performance Comparison

Here, the performance of CSMA/CAP, according to an embodiment, is compared to the performance of CSMA with ACK packets only, for both fully connected and hidden terminal scenarios. For comparison purposes, it is assumed that the data rate is 1 megabit per second (Mbps, 1 Mbps=$2^{20}$ bits per second=1,048,576 bits per second) for the entire available bandwidth, and that an RTS packet and an ACK packet lasts 352 bits including the MAC and the physical-layer headers. It is also assumed that ω is 10 microseconds (μs, 1 μs=$10^{-6}$ seconds), which agrees with the characteristics of half-duplex transceivers available at the time of writing.

Figure 12:
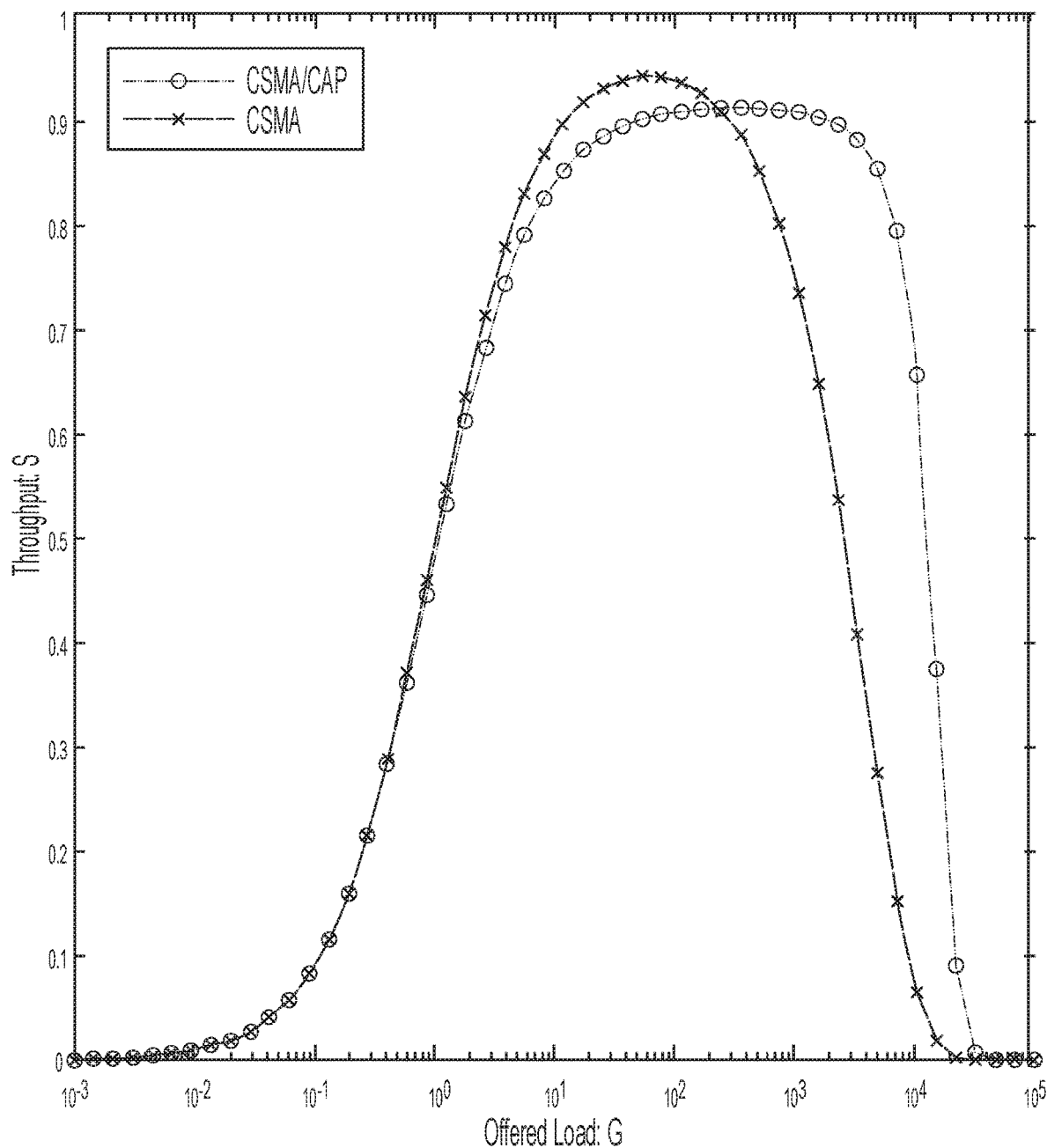
FIG. 12 and FIG. 13 are a graphs that illustrate example throughput comparisons for overhead in fully connected scenarios and improvements in the presence of hidden terminals, respectively, according to an embodiment.
Figure 13:
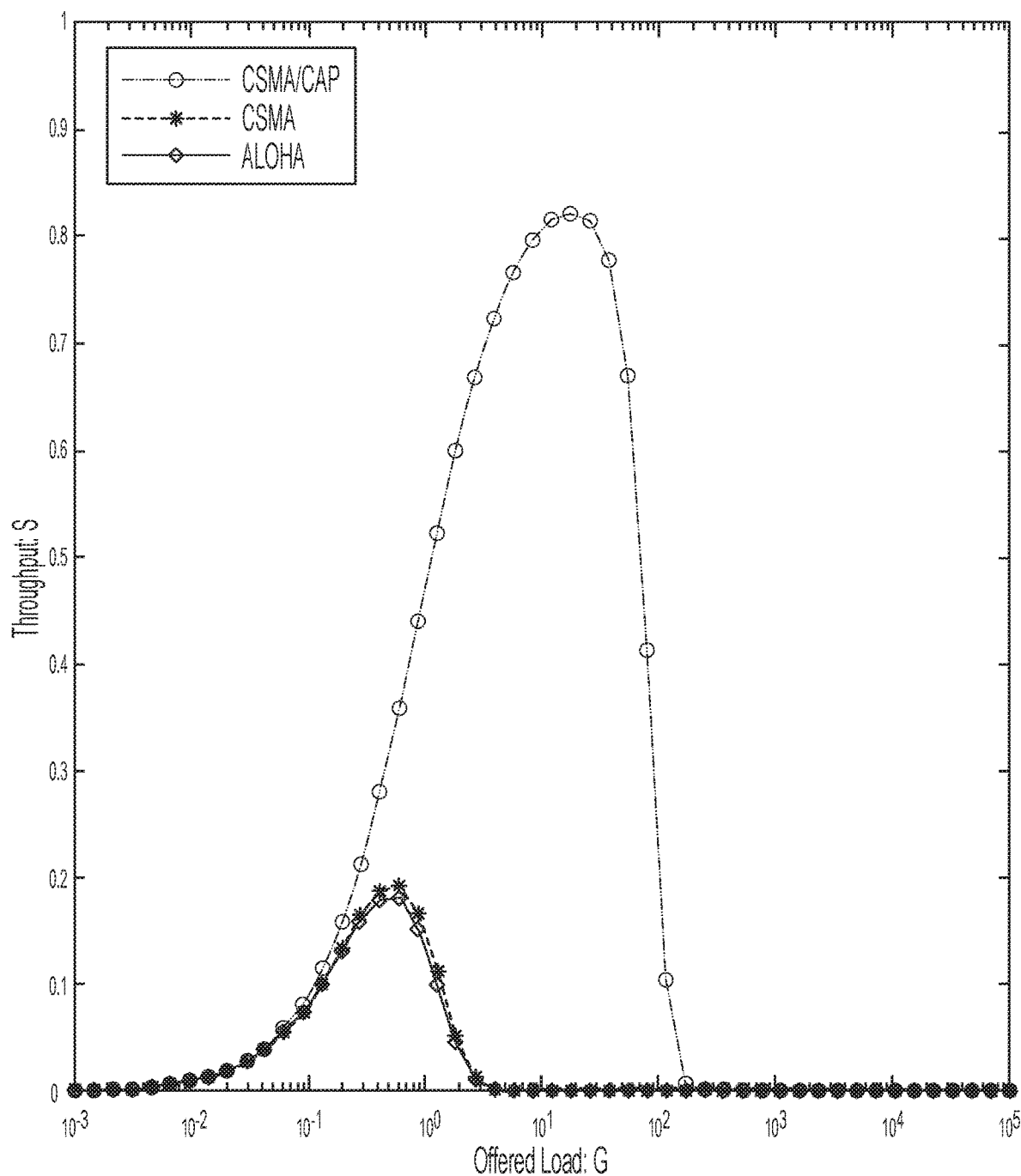

FIG. 12 and FIG. 13 are graphs that illustrate example throughput comparisons for overhead in fully connected scenarios and improvements in the presence of hidden terminals, respectively, according to an embodiment. In each, the horizontal axis indicates offered load, G, relative to an average load which is dimensionless; and, the vertical axis indicates throughput in percent of time channel is active, also dimensionless. The various traces are labeled by symbols.

For a fully connected scenario, the throughput of the CSMA/CAP embodiment is given by Expression 12; and the throughput of the CSMA with ACK packets only and no pilots is given by Expression 28 as derived by J. J. Garcia-Luna-Aceves 2017 [7].

$$S_{CSMA} = \frac{\delta}{\alpha + \omega + \tau + \frac{1}{\lambda} + e^{\lambda(\omega + \tau)}(\delta + \omega + 2\tau)} \quad (28)$$

These throughputs are compared in FIG. 12 for a wireless local-area network (WLAN) scenario that highlights the additional overhead incurred by CSMA/CAP over CSMA in order to eliminate MAI on data packets and ACK packets. Physical distances are around 500 meters, and the duration of a data packet is 1500 bytes (1 byte=8 bits) including the physical and MAC-layer headers, which corresponds to an average-length IP packet and takes 0.012 s to transmit at 1 Mbps. A normalized propagation delay of $1\times10^{-4}$ seconds is used.

As expected, the maximum throughput attained by CSMA/CAP (open circles) is lower than the one attained by CSMA with ACK packets only (x symbols). This is a direct consequence of the additional signaling and waiting times used in CSMA/CAP to prevent MAI on data packets or ACK packets. However, as the results also show, CSMA/CAP is more stable than CSMA as channel load increases, which is due to the shorter duration of collision intervals in CSMA/CAP compared to CSMA with only ACK packets.

As also expected, an advantage is evident in the presence of hidden terminals. FIG. 13 shows the throughput of pure ALOHA with no ACK packets (open diamond) as published in [1], CSMA/CAP (asterisk) based on Expression 15, and CSMA with ACK packets only but no pilots (open circles) based on Expression 20. The same parameter values are used as used for the fully-connected scenario. The CSMA/CAP embodiment is capable of much higher throughput, e.g., four times the maximum of the prior art approaches, because it handles much higher loads, e.g., more than a factor of ten higher loads.

The results illustrate the advantage of using pilots as part of collision avoidance compared to simply using carrier sensing in the presence of hidden terminals. The throughput of CSMA with only ACK packets (no pilots) degrades to almost that of ideal ALOHA with no ACK packets. This performance degradation can be understood intuitively from FIG. 10 and FIG. 11. As the figures illustrate, both successful and unsuccessful busy periods in CSMA with only ACK packets contain trains of colliding data packets and the vulnerability period of any such packet is its entire transmission time, just as in pure ALOHA. Only a few successful transmission periods consist of a single data packet and an ACK, and only a relatively small number of sources with packets to send back off after detecting carrier from the ACK (see FIG. 10). The performance degradation due to hidden terminals in CSMA/CAP is due to the fact that, as FIG. 9 illustrates, an RTS arriving at the central receiver is vulnerable for its entire duration, rather than just for τ+ω seconds.

The results clearly show that CSMA/CAP is a viable approach to implementing collision avoidance correctly and efficiently in multi-hop ad-hoc networks. It provides a marked improvement over CSMA in multi-hop ad-hoc networks, and the degradation in maximum throughput for CSMA/CAP compared to CSMA is relatively small in fully-connected networks.

3. Hardware Overview

Figure 14:
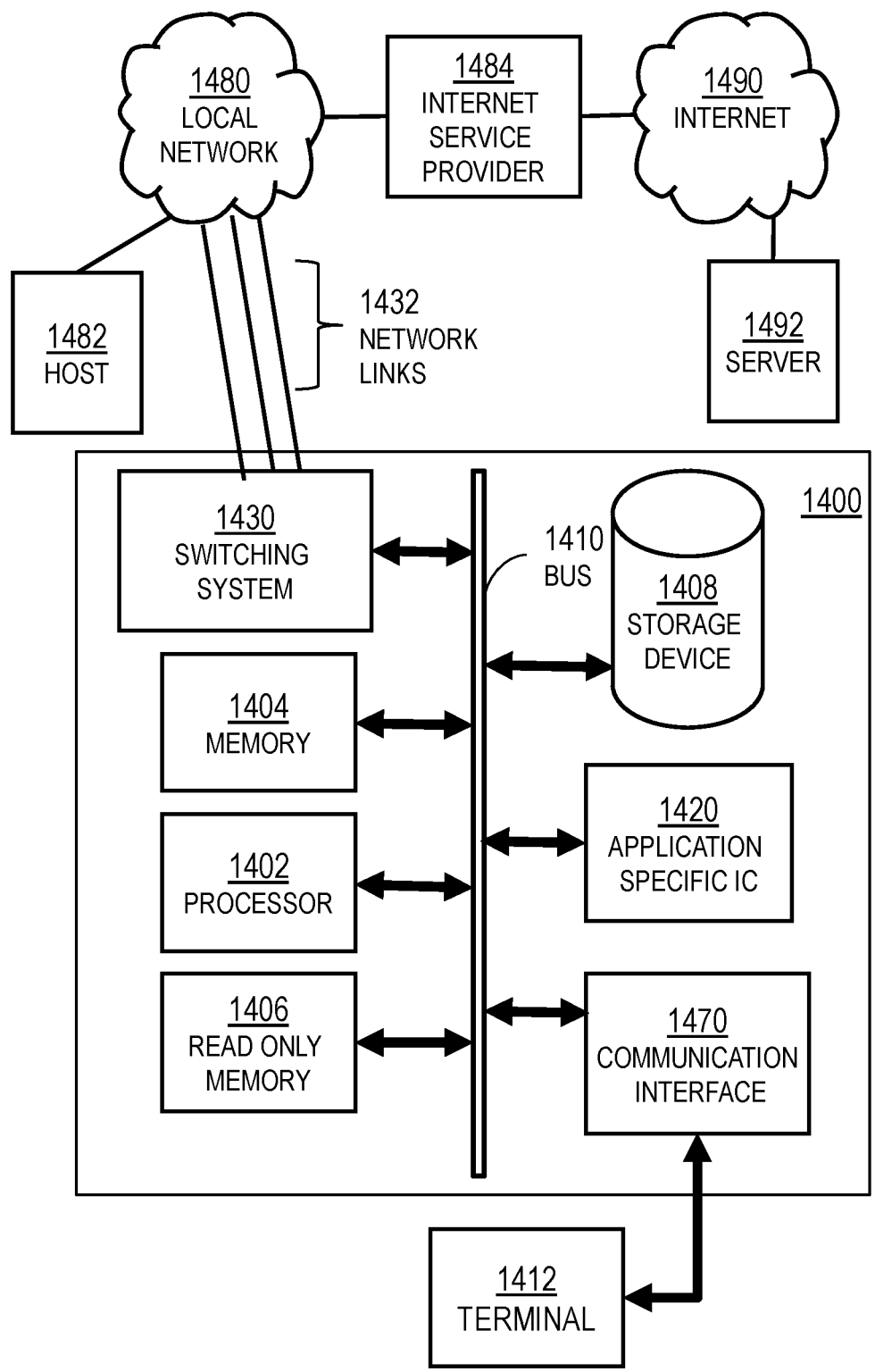
FIG. 14 is a block diagram that illustrates a computer system upon which an embodiment of the invention may be implemented.

FIG. 14 is a block diagram that illustrates a computer system 1400 upon which an embodiment of the invention may be implemented. Computer system 1400 includes a communication mechanism such as a bus 1410 for passing information between other internal and external components of the computer system 1400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1400, or a portion thereof, constitutes a means for performing one or more steps of one or more methods described herein.

A sequence of binary digits constitutes digital data that is used to represent a number or code for a character. A bus 1410 includes many parallel conductors of information so that information is transferred quickly among devices coupled to the bus 1410. One or more processors 1402 for processing information are coupled with the bus 1410. A processor 1402 performs a set of operations on information. The set of operations include bringing information in from the bus 1410 and placing information on the bus 1410. The set of operations also typically include comparing two or more units of information, shifting positions of units of information, and combining two or more units of information, such as by addition or multiplication. A sequence of operations to be executed by the processor 1402 constitutes computer instructions.

Computer system 1400 also includes a memory 1404 coupled to bus 1410. The memory 1404, such as a random access memory (RAM) or other dynamic storage device, stores information including computer instructions. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of computer instructions. The computer system 1400 also includes a read only memory (ROM) 1406 or other static storage device coupled to the bus 1410 for storing static information, including instructions, that is not changed by the computer system 1400. Also coupled to bus 1410 is a non-volatile (persistent) storage device 1408, such as a magnetic disk or optical disk, for storing information, including instructions, that persists even when the computer system 1400 is turned off or otherwise loses power.

Information, including instructions, is provided to the bus 1410 for use by the processor from an external terminal 1412, such as an input device like a keyboard containing alphanumeric keys operated by a human user, or a sensor. A sensor detects conditions in its vicinity and transforms those detections into signals compatible with the signals used to represent information in computer system 1400. Other external devices serving as terminal 1412 coupled to bus 1410, used primarily for interacting with humans, include a display device such as a cathode ray tube (CRT) or a liquid crystal display (LCD), for presenting images, and a pointing device, such as a mouse or a trackball or cursor direction keys, for controlling a position of a small cursor image presented on the display and issuing commands associated with graphical elements presented on the display.

In the illustrated embodiment, special purpose hardware, such as an application specific integrated circuit (IC) 1420, is coupled to bus 1410. The special purpose hardware is configured to perform operations not performed by processor 1402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 1400 includes switching system 1430 as special purpose hardware for switching information for flow over a network. Switching system 1430 typically includes multiple communications interfaces, such as communications links 1432, for coupling to multiple other devices. In general, each coupling is with a network link 1432 that is connected to another device in or attached to a network, such as local network 1480 in the illustrated embodiment, to which a variety of external devices with their own processors are connected. In some embodiments an input interface or an output interface or both are linked to each of one or more external network elements. Although three network links 1432a, 1432b, 1432c are included in network links 1432 in the illustrated embodiment, in other embodiments, more or fewer links are connected to switching system 1430. Network links 1432 typically provides information communication through one or more networks to other devices that use or process the information. For example, network link 1432b may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490. A computer called a server 1492 connected to the Internet provides a service in response to information received over the Internet. For example, server 1492 provides routing information for use with switching system 1430.

The switching system 1430 includes logic and circuitry configured to perform switching functions associated with passing information among elements of network 1480, including passing information received along one network link, e.g. 1432a, as output on the same or different network link, e.g., 1432c. The switching system 1430 switches information traffic arriving on an input interface to an output interface according to pre-determined protocols and conventions that are well known. In some embodiments, switching system 1430 includes its own processor and memory to perform some of the switching functions in software. In some embodiments, switching system 1430 relies on processor 1402, memory 1404, ROM 1406, storage 1408, or some combination, to perform one or more switching functions in software. For example, switching system 1430, in cooperation with processor 1404 implementing a particular protocol, can determine a destination of a packet of data arriving on input interface on link 1432a and send it to the correct destination using output interface on link 1432c. The destinations may include host 1482, server 1492, other terminal devices connected to local network 1480 or Internet 1490, or other routing and switching devices in local network 1480 or Internet 1490.

Computer system 1400 also includes one or more instances of a communications interface 1470 coupled to bus 1410. Communication interface 1470 provides a two-way communication coupling to a variety of external devices that operate with their own processors, such as printers, scanners and external disks. In general the coupling is with a network link 1432 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1470 sends and receives electrical, acoustic or electromagnetic signals, including infrared and optical signals, that carry information streams, such as digital data.

The term computer-readable medium is used herein to refer to any medium that participates in providing information to processor 1402, including instructions for execution. Such a medium may take many forms, including, but not limited to, non-volatile media, volatile media and transmission media. Non-volatile media include, for example, optical or magnetic disks or FLASH drives, such as storage device 1408. Volatile media include, for example, dynamic memory 1404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1402, except for carrier waves and other signals.

Logic encoded in one or more tangible media includes one or both of processor instructions on a computer-readable storage media and special purpose hardware, such as ASIC 1420.

The invention is related to the use of computer system 1400 for implementing the techniques described herein. According to one embodiment of the invention, those techniques are performed by computer system 1400 in response to processor 1402 executing one or more sequences of one or more instructions contained in memory 1404. Such instructions, also called software and program code, may be read into memory 1404 from another computer-readable medium such as storage device 1408. Execution of the sequences of instructions contained in memory 1404 causes processor 1402 to perform the method steps described herein. In alternative embodiments, hardware, such as application specific integrated circuit 1420, may be used in place of or in combination with software to implement the invention. Thus, embodiments of the invention are not limited to any specific combination of hardware and software.

The signals transmitted over network link 1432 and other networks through communications interface 1470, carry information to and from computer system 1400. Computer system 1400 can send and receive information, including program code, through the networks 1480, 1490 among others, through network link 1432 and communications interface 1470. In an example using the Internet 1490, a server 1492 transmits program code for a particular application, requested by a message sent from computer 1400, through Internet 1490, ISP equipment 1484, local network 1480 and communications interface 1470. The received code may be executed by processor 1402 as it is received, or may be stored in storage device 1408 or other non-volatile storage for later execution, or both. In this manner, computer system 1400 may obtain application program code in the form of a signal on a carrier wave.

Various forms of computer readable media may be involved in carrying one or more sequence of instructions or data or both to processor 1402 for execution. For example, instructions and data may initially be carried on a magnetic disk of a remote computer such as host 1482. The remote computer loads the instructions and data into its dynamic memory and sends the instructions and data over a telephone line using a modem. A modem local to the computer system 1400 receives the instructions and data on a telephone line and uses an infra-red transmitter to convert the instructions and data to a signal on an infra-red a carrier wave serving as the network link 1432. An infrared detector serving as communications interface 1470 receives the instructions and data carried in the infrared signal and places information representing the instructions and data onto bus 1410. Bus 1410 carries the information to memory 1404 from which processor 1402 retrieves and executes the instructions using some of the data sent with the instructions. The instructions and data received in memory 1404 may optionally be stored on storage device 1408, either before or after execution by the processor 1402.

4. Alternatives, Extensions, Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

7. References

Each of the references cited below is hereby incorporated by reference as if fully set forth herein except for terminology inconsistent with that used herein.

[1] N. Abramson, "The Throughput of Packet Broadcasting Channels," IEEE Trans. Commun., January 1977.
[2] M. Carvalho et al., "Modeling Energy Consumption in Single-Hop IEEE 802.11 Ad Hoc Networks," Proc. IEEE ICCCN '04, 2004.
[3] C. L. Fullmer and J. J. Garcia-Luna-Aceves, "Solutions to Hidden Terminal Problems in Wireless Networks," Proc. ACM SIGCOMM '97, 1997.
[4] C. L. Fullmer and J. J. Garcia-Luna-Aceves, "FAMA-PJ: a channel access protocol for wireless LANs," Proc. ACM MobiCom '95, 1995.
[5] J. J. Garcia-Luna-Aceves and A. Tzamaloukas, "Receiver-Initiated Collision Avoidance in Wireless Networks," Wireless Networks, 2002.
[6] J. J. Garcia-Luna-Aceves, "Carrier-Sense Multiple Access with Collision Avoidance and Detection," Proc. ACM MSWIM '17, 2017.
[7] J. J. Garcia-Luna-Aceves, "Carrier Resolution Multiple Access," Proc. ACM PE-WASUN '17, 2017.
[8] J. J. Garcia-Luna-Aceves, "Carrier-Tone Multiple Access with Collision Avoidance and Detection," Proc. IEEE WCNC '18, 2018.
[9] J. J. Garcia-Luna-Aceves and Marcelo M. Carvalho, "Collaborative Collision Detection with Half-Duplex Radios," Proc. IEEE WCNC '18, 2018.
[10] Z. Haas and J. Deng, "Dual Busy Tone Multiple Access (DBTMA)—A Multiple Access Control Scheme for Ad Hoc Networks," IEEE Trans. Commun., June 2002.
[11] K. Jamieson et al., "Understanding The Real-World Performance of Carrier Sense," Proc. ACM E-WIND '05, 2005.
[12] P. Karn, "MACA—A New Channel Access Method for Packet Radio, Proc. ARRL/CRRL, 1990.
[13] L. Kleinrock and F. A. Tobagi, "Packet Switching in Radio Channels: Part I—Carrier Sense Multiple-Access Modes and Their Throughput-Delay Characteristics," IEEE Trans. Commun., 1975.

[14] F. A. Tobagi and L. Kleinrock, "Packet Switching in Radio Channels: Part II—The Hidden Terminal Problem in Carrier Sense Multiple-Access Modes and The Busy-Tone Solution," IEEE Trans. Commun., 1975.

What is claimed is:

1. A method implemented on a receiver node using a half duplex wireless transceiver comprising, in response to receiving a request to send (RTS) message with variable length data from a first transmitting node, transmitting a clear to send (CTS) message that indicates the first transmitting node, wherein said transmitting the CTS message is followed by transmitting a separate physical layer first pilot message indicating a bit pattern of predetermined length such that a receiving node interprets the predetermined length of the bit pattern as a presence of the first pilot message.

2. A method implemented on a current network node using a half duplex wireless transceiver comprising,
   in response to receiving a request to send (RTS) message with variable length data from a first transmitting node, transmitting a clear to send (CTS) message that indicates the first transmitting node followed by transmitting a physical layer first pilot message; and
   only in response to successfully receiving the RTS message with the variable length data that indicates the first transmitting node, wherein said receiving is followed by receiving a physical layer second pilot message and transmitting an acknowledgement message that indicates the first transmitting node.

3. The method as recited in claim 2, wherein a transmission time of each of the first pilot message and the second pilot message is longer than predetermined time equal to an expected propagation delay time and an expected turnaround time.

4. The method as recited in claim 2, wherein the second pilot message is detected using either or both of energy detection and preamble detection.

5. The method as recited in claim 2, wherein each of the first pilot message and the second pilot message comprises a synchronization field and a frame delimiter field indicating an end of a physical layer frame.

6. The method as recited in claim 2, wherein a transmission time of each of the first pilot message and the second pilot message is longer than predetermined time equal to an expected propagation delay time and an expected turnaround time.

7. The method as recited in claim 2, wherein each of the first pilot message and the second pilot message comprises a synchronization field and a frame delimiter field indicating an end of a physical layer frame.

8. A method implemented on a current network node using a half duplex wireless transceiver comprising:
   in response to transmitting a request to transmit message, receiving from a first node a clear to transmit message followed by receiving a physical layer first pilot message that indicates a second node;
   determining whether the current network node is the second node indicated in the physical layer pilot message; and
   only when the current network node is the second node, transmitting a variable length data message followed by an extend time delay followed by a physical layer second pilot message that indicates the current node.

9. The method as recited in claim 8, wherein a transmission time of each of the first pilot message and the second pilot message is longer than predetermined time related to an expected propagation delay time and an expected turnaround time.

10. The method as recited in claim 8, wherein the first pilot message is detected using either or both of energy detection and preamble detection.

11. The method as recited in claim 8, wherein each of the first pilot message and the second pilot message comprises a synchronization field and a frame delimiter field indicating an end of a physical layer frame.

12. The method as recited in claim 8, wherein a sum of the extend time delay and a transmit time for the variable length data message is equal to a transmit time of a longest data packet allowed.

13. The method as recited in claim 8, further comprising when the current network node is not the second node then not transmitting any message for at least a back off time, wherein the backoff time is longer than a sum of a transmit time of a longest data packet allowed and a transmit time of an acknowledgement message and a longest propagation time between non-hidden nodes.

14. The method as recited in claim 13, wherein the backoff time is a random time.

15. A non-transitory computer-readable medium carrying one or more sequences of instructions, wherein execution of the one or more sequences of instructions by one or more processors causes the one or more processors to perform the steps of, in response to receiving on a half duplex wireless transceiver a request to send (RTS) message with variable length data from a first transmitting node, transmitting a clear to send (CTS) message that indicates the first transmitting node, wherein said transmitting the CTS message is followed by transmitting a separate physical layer first pilot message indicating a bit pattern of predetermined length such that a receiving node interprets the predetermined length of the bit pattern as a presence of the first pilot message.

16. A non-transitory computer-readable medium carrying one or more sequences of instructions, wherein execution of the one or more sequences of instructions by one or more processors causes the one or more processors to perform the steps of:
   in response to transmitting a request to transmit message indicating a current node using a half duplex wireless transceiver, receiving from a first node a clear to transmit message that indicates a second node followed by receiving a physical layer first pilot message;
   determining whether the current network node is the second node indicated in the clear to transmit message; and
   only when the current network node is the second node, transmitting a variable length data message that indicates the current node followed by an extend time delay followed by a physical layer second pilot message.

17. An apparatus comprising:
   a half duplex wireless communications link;
   at least one processor; and
   at least one memory including one or more sequences of instructions,
   the at least one memory and the one or more sequences of instructions configured to, with the at least one processor, cause the apparatus to at least:
      transmit a clear to send (CTS) message that indicates a first transmitting node in response to receiving a request to send (RTS) message with variable length data from the first transmitting node and transmit a separate physical layer first pilot message after transmitting the CTS message, wherein the first pilot message indicates a bit pattern of predetermined length such that a receiving node interprets the predetermined length of the bit pattern as a presences message.

18. An apparatus comprising:

a half duplex wireless communications link;

at least one processor; and at least one memory including one or more sequences of instructions, the at least one memory and the one or more sequences of instructions configured to, with the at least one processor, cause the apparatus to perform at least the following:

in response to transmitting a request to transmit message, receive from a first node a clear to transmit message followed by receiving a physical layer first pilot message that indicates a second node;

determine whether the current network node is the second node indicated in the physical layer pilot message; and only when the current network node is the second node, transmit a variable length data message followed by an extend time delay followed by a physical layer second pilot message that indicates the current node.

* * * * *